United States Patent
Kim et al.

(10) Patent No.: US 9,272,630 B2
(45) Date of Patent: Mar. 1, 2016

(54) ELECTRONIC DEVICE AND METHOD FOR TRANSMITTING AND RECEIVING WIRELESS POWER

(75) Inventors: Nam Yun Kim, Seoul (KR); Young Tack Hong, Seongnam-si (KR); Sang Wook Kwon, Seongnam-si (KR); Yun Kwon Park, Dongducheon-si (KR); Ki Young Kim, Yongin-si (KR); Young Ho Ryu, Yongin-si (KR); Dong Zo Kim, Yongin-si (KR); Jin Sung Chol, Gimpo-si (KR); Chang Wook Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 922 days.

(21) Appl. No.: 13/469,555

(22) Filed: May 11, 2012

(65) Prior Publication Data

US 2012/0299390 A1    Nov. 29, 2012

(30) Foreign Application Priority Data

May 27, 2011    (KR) .................. 10-2011-0050402

(51) Int. Cl.
*H02J 17/00* (2006.01)
*B60L 11/18* (2006.01)
*H02J 5/00* (2006.01)
*H02J 7/02* (2006.01)
*H04B 5/00* (2006.01)
*H01F 38/14* (2006.01)

(52) U.S. Cl.
CPC ............ *B60L 11/182* (2013.01); *H02J 5/005* (2013.01); *H02J 7/025* (2013.01); *H04B 5/0037* (2013.01); *H04B 5/0075* (2013.01); *H01F 38/14* (2013.01); *Y02T 10/7005* (2013.01); *Y02T 90/122* (2013.01); *Y02T 90/14* (2013.01)

(58) Field of Classification Search
None
See application file for complete search history.

(56) References Cited

U.S. PATENT DOCUMENTS

2009/0108679 A1    4/2009    Porwal
2011/0248572 A1*   10/2011   Kozakai et al. ............... 307/104

FOREIGN PATENT DOCUMENTS

KR    10-2009-0056546    6/2009
KR    10-2009-0131746    12/2009
WO    WO 2007/084716 A2   7/2007

* cited by examiner

*Primary Examiner* — Jared Fureman
*Assistant Examiner* — Aqeel Bukhari
(74) *Attorney, Agent, or Firm* — NSIP Law

(57) ABSTRACT

An electronic device and method for transmitting and receiving a wireless power are provided. An electronic device for transmitting and receiving wireless power may include a resonator configured to operate, based on a plurality of operating modes of the electronic device including a power reception mode, a relay mode, and a power transmission mode, wherein: (i) in the power reception mode, the resonator is configured to receive power from a wireless power transmitter, (ii) in the relay mode, the resonator is configured to relay power received from the wireless power transmitter to a wireless power receiver, and (iii) in the power transmission mode, the resonator is configured to transmit power to the wireless power receiver; and a path controller configured to control at least one electrical pathway of electronic device based on the operating mode.

30 Claims, 28 Drawing Sheets

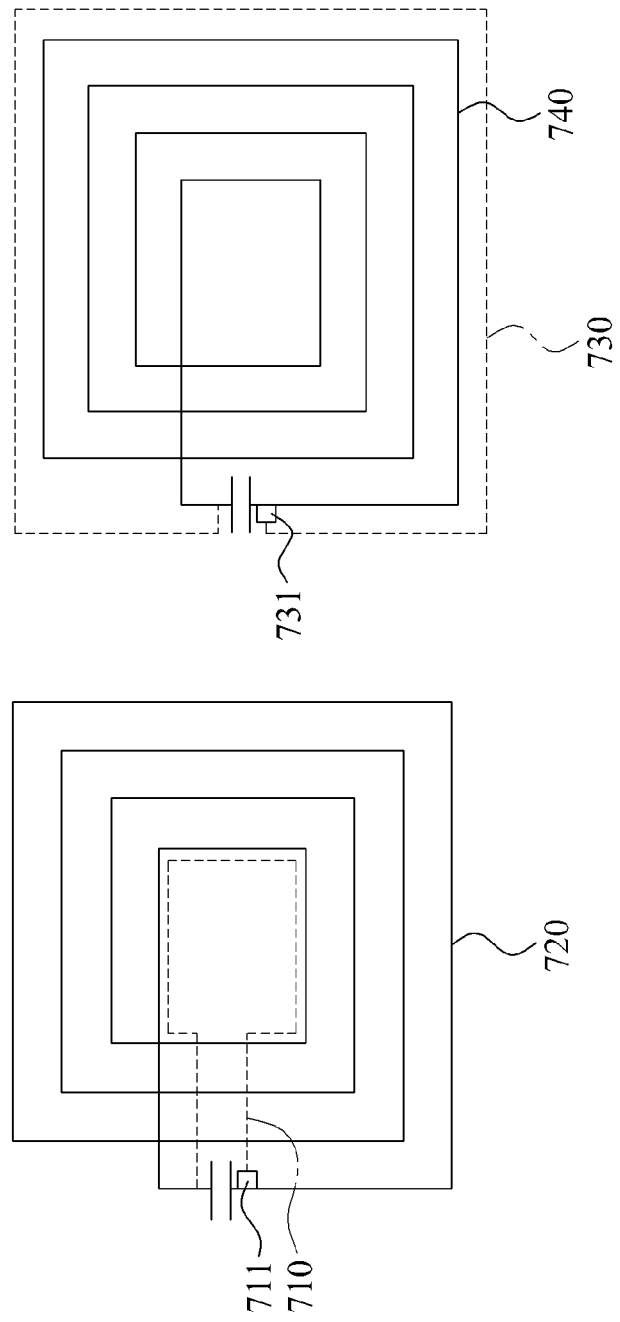

1000

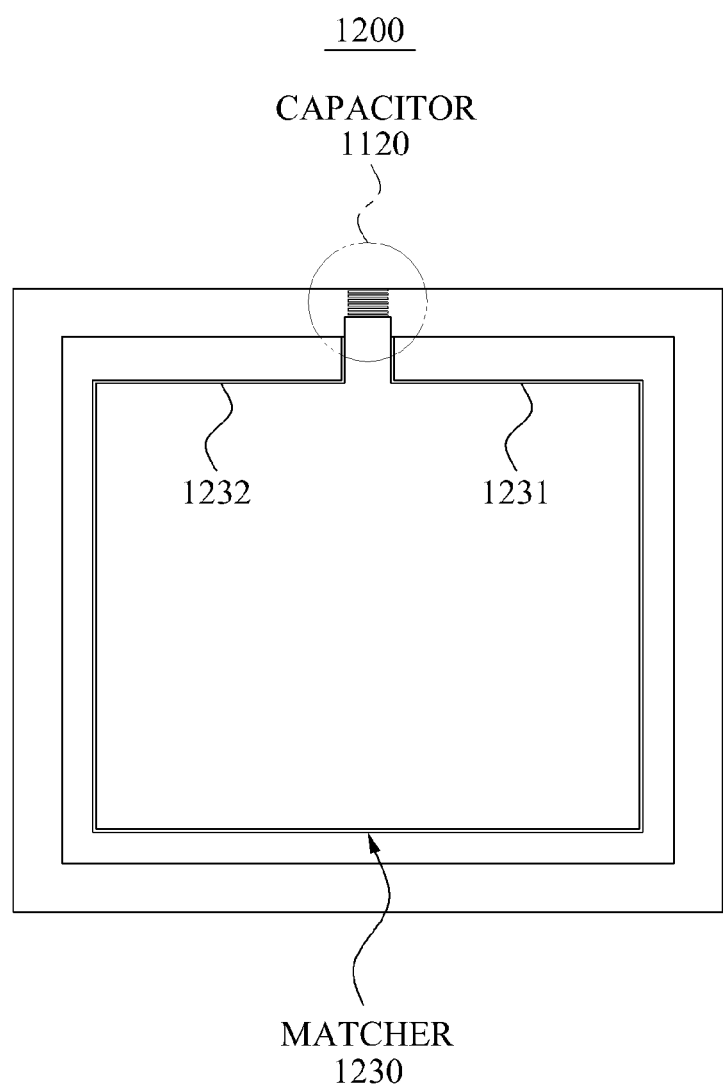

ELECTRONIC DEVICE AND METHOD FOR TRANSMITTING AND RECEIVING WIRELESS POWER

CROSS-REFERENCE TO RELATED APPLICATION(S)

This application claims the benefit under 35 U.S.C. §119 (a) of Korean Patent Application No. 10-2011-0050402, filed on May 27, 2011, in the Korean Intellectual Property Office, the entire disclosure of which is incorporated herein by reference for all purposes.

BACKGROUND

1. Field

The following description relates to transmitting and receiving wireless power.

2. Description of Related Art

Wireless power refers to energy that is transferred from a wireless power transmitter to a wireless power receiver through magnetic coupling. Typically, a wireless power transmission and charging system includes a source device and a target device. The source device may wirelessly transmit a power, and the target device may wirelessly receive a power. The source device may be referred to as a wireless power transmitter, and the target device may be referred to as a wireless power receiver.

The source device includes a source resonator, and the target device includes a target resonator. Magnetic coupling or resonance coupling may be formed between the source resonator and the target resonator.

SUMMARY

According to one general aspect, an electronic device for transmitting and receiving wireless power may include: a resonator configured to operate, based on a plurality of operating modes of the electronic device including a power reception mode, a relay mode, and a power transmission mode, wherein: (i) in the power reception mode, the resonator is configured to receive power from a wireless power transmitter, (ii) in the relay mode, the resonator is configured to relay power received from the wireless power transmitter to a wireless power receiver, and (iii) in the power transmission mode, the resonator is configured to transmit power to the wireless power receiver; and a path controller configured to control at least one electrical pathway of electronic device based on the operating mode.

The electronic device may further include: a power converter configured to convert direct current (DC) voltage to alternating current (AC) voltage using a resonance frequency, and to transfer the AC current to the resonator, when the electronic device is operated in the power transmission mode.

The electronic device may further include: a power amplifier configured to amplify the DC voltage.

The electronic device may further include: a rectification unit configured to generate a DC signal by rectifying an AC signal of a power received via the resonator, when the electronic device is operated in the power reception mode.

The electronic device may further include: a DC-to-DC (DC/DC) converter configured to supply voltage of a predetermined level to a load by adjusting a level of the DC signal.

The electronic device may further include: a control/communication unit configured to perform a communication with the wireless power transmitter or the wireless power receiver, to determine the operating mode by the communication, to control the path controller based on the determined operating mode, or any combination thereof.

The resonator may be configured to receive the power from the wireless power transmitter by passing through one or more electronic devices.

The resonator may be configured to transmit the power to the wireless power receiver by passing through one or more electronic devices.

The resonator may be configured to simultaneously transmit the power to a plurality of electronic devices.

The electronic device may further include: a control/communication unit configured to control a magnetic field to be uniformly distributed, based on a direction of an induced current flowing in the resonator, and on a direction of an input current flowing in a feeding unit, wherein the magnetic field is formed in the resonator.

According to another general aspect, a method for transmitting and receiving wireless power in an electronic device may include: determining one of a plurality of operating modes of the electronic device, the plurality of operating modes of the electronic device including a power reception mode, a relay mode, and a power transmission mode; and (i) in the power reception mode, receiving power from a wireless power transmitter, (ii) in the relay mode, relaying power received from the wireless power transmitter to a wireless power receiver, and (iii) in the power transmission mode, transmitting power to the wireless power receiver.

The method may further include: performing a communication with another electronic device to determine the operating mode of the electronic device.

The method may further include: supplying voltage of a predetermined level to a load by adjusting a level of a DC signal.

The method may further include: generating power using a resonance frequency; and transferring the generated power to a resonator.

The method may further include: generating a DC signal by rectifying an AC signal of power received via a resonator.

The method may further include: receiving the power from the wireless power transmitter by passing through one or more electronic devices.

The method may further include: transmitting the power to the wireless power receiver by passing through one or more electronic devices.

The method may further include: simultaneously transmitting the power to a plurality of electronic devices.

According to yet another aspect, a resonator device may include: a feeder configured to receive an input current and to form a magnetic field; and a resonator configured to form another magnetic field based on an induced current generated by the magnetic field of the feeder, wherein, when the magnetic field formed by the feeder and the another magnetic field formed by the source resonator are combined, the strength of the combined magnetic field changes within the feeder and outside the feeder.

The strength of the combined magnetic field may decrease within the feeder and increase outside the feeder; or the strength of the combined magnetic field may increase within the feeder and decease outside the feeder.

The resonator and the feeder have a common ground.

The resonator may include a capacitor.

The feeder may be electrically connected to the capacitor.

The feeder may be positioned at least partially within the resonator.

The resonator may have a closed loop structure.

The resonator may include: a first transmission line comprising a first signal conducting portion, a second signal conducting portion, and a first ground conducting portion, the first ground conducting portion corresponding to the first signal conducting portion and the second signal conducting portion; a first conductor electrically connecting the first signal conducting portion to the first ground conducting portion; a second conductor electrically connecting the second signal conducting portion to the first ground conducting portion; and at least one first capacitor inserted between the first signal conducting portion and the second signal conducting portion, in series with respect to a current flowing through the first signal conducting portion and the second signal conducting portion.

The feeder may include: a second transmission line comprising a third signal conducting portion, a fourth signal conducting portion, and a second ground conducting portion, the second ground conducting portion corresponding to the third signal conducting portion and the fourth signal conducting portion; a third conductor electrically connecting the third signal conducting portion to the second ground conducting portion; a fourth conductor electrically connecting the fourth signal conducting portion to the second ground conducting portion; a fifth conductor electrically connecting the first signal conducting portion to the third signal conducting portion; and a sixth conductor electrically connecting the second signal conducting portion to the fourth signal conducting portion.

The resonator device may further include: a control/communication unit configured to control the magnetic field to be uniformly distributed, based on a direction of an induced current flowing in the resonator, and on a direction of an input current flowing in the feeder.

The controller may be configured to adjust the size of the feeder.

The resonator device may further include a matching device configured to match the input impedance to an output impedance.

Other features and aspects will be apparent from the following detailed description, the drawings, and the claims.

BRIEF DESCRIPTION OF THE DRAWINGS

FIG. 7 is a diagram illustrating still another wireless power transmitter.

Figure 1:
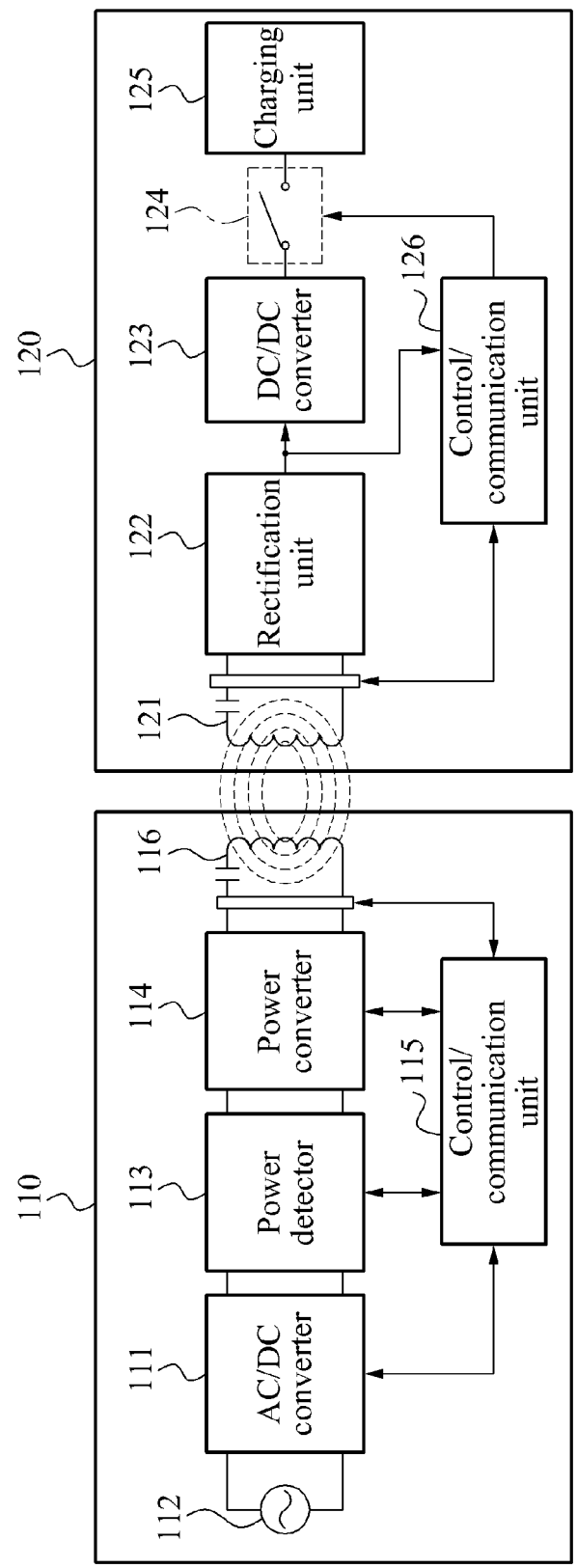
FIG. 1 is a diagram illustrating a wireless power transmission and charging system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates a wireless power transmission and charging system.

As shown, the wireless power transmission and charging system includes a source device 110, and a target device 120.

The source device 110 may include an alternating current-to-direct current (AC/DC) converter 111, a power detector 113, a power converter 114, a control/communication unit 115, an impedance adjusting unit 117, and a source resonator 116.

The target device 120 may include a target resonator 121, a rectification unit 122, a DC-to-DC (DC/DC) converter 123, a switch unit 124, a charging unit 125, and a control/communication unit 126.

The AC/DC converter 111 may generate a DC voltage by rectifying an AC voltage (e.g., in a band of tens of hertz (Hz)) output from a power supply 112. The AC/DC converter 111 may be configured to output a DC voltage of a predetermined level, and/or to adjust an output level of a DC voltage based on the control of the control/communication unit 115.

The power detector 113 may detect an output current and an output voltage of the AC/DC converter 111, and may transfer, to the control/communication unit 115, information on the detected current and the detected voltage. Additionally or alternatively, the power detector 113 may detect an input current and an input voltage of the power converter 114.

The power converter 114 may be configured to convert DC voltage of a predetermined level to AC voltage, for instance, using a switching pulse signal (e.g., in a band of a few megahertz (MHz) to tens of MHz). Other frequencies of AC power are also possible. In some implementations, the power converter 114 may convert a DC voltage supplied to a power amplifier to an AC voltage, using a reference resonance frequency $F_{Ref}$, and may output power.

The impedance adjusting unit 117 may include a plurality of, e.g., N, matching switches connected to a plurality of capacitors. The impedance adjusting unit 117 may adjust an impedance of the source resonator 116 by turning ON or OFF the N matching switches. The impedance adjusting unit 117 may include a Pi matching circuit or a T matching circuit, in some instances.

The control/communication unit 115 may be configured to detect a reflected wave of a transmission power, and may detect mismatching between the target resonator 121 and the source resonator 116 based on the detected reflected wave. To detect the mismatching, the control/communication unit 115 may detect an envelope of the reflected wave, detect a power amount of the reflected wave, or both.

The control/communication unit 115 may calculate and/or compute a voltage standing wave ratio (VSWR), based on a voltage level of the reflected wave, and based on a level of an output voltage of the source resonator 116 or the power converter 114. For example, if the VSWR is less than a predetermined value, the control/communication unit 115 may determine that the mismatching is detected. For example, the control/communication unit 115 may turn ON or OFF the N matching switches, may determine a tracking impedance $Im_{Best}$ with an optimal or the best power transmission efficiency, and may adjust the impedance of the source resonator 116 to the tracking impedance $Im_{Best}$.

Additionally or alternatively, the control/communication unit 115 may be configured to adjust a frequency of a switching pulse signal. Under the control of the control/communication unit 115, the frequency of the switching pulse signal may be determined. And, by controlling the power converter 114, the control/communication unit 115 may generate a modulation signal to be transmitted to the target device 120. Also, the control/communication unit 115 may transmit various messages to the target device 120 using in-band communications. Moreover, the control/communication unit 115 may detect a reflected wave, and may demodulate a signal received from the target device 120 through an envelope of the detected reflected wave.

The control/communication unit 115 may generate a modulation signal for in-band communication, using various schemes. To generate a modulation signal, the control/communication unit 115 may turn ON or OFF a switching pulse signal, and/or may perform delta-sigma modulation. Additionally or alternatively, the control/communication unit 115 may generate a pulse-width modulation (PWM) signal with a predetermined envelope.

The control/communication unit 115 may perform out-band communication using a communication channel. The control/communication unit 115 may include a communication module, for example, configured to handle ZigBee, Bluetooth, Wi-Fi, Wi-max, near field communication (NFC), radio frequency identification (RFID), and/or other communication protocols. The control/communication unit 115 may transmit or receive data to or from the target device 120 using the out-band communication.

The source resonator 116 may be configured to transfer electromagnetic energy to the target resonator 121. For example, the source resonator 116 may transfer, to the target device 120, communication power used for communication, charging power used for charging or both, using a magnetic coupling with the target resonator 121.

The target resonator 121 may receive electromagnetic energy from the source resonator 116. For example, the target resonator 121 may receive, from the source device 110, the communication power and/or the charging power using the magnetic coupling with the source resonator 116. Additionally or alternatively, the target resonator 121 may receive various messages from the source device 110 using the in-band communication.

The rectification unit 122 may generate a DC voltage by rectifying an AC voltage. For instance, the AC voltage may be received from the target resonator 121.

The DC/DC converter 123 may be configured to adjust a level of the DC voltage output from the rectification unit 122 based on a capacity of the charging unit 125. For example, the DC/DC converter 123 may adjust, from 3 to 10 volt (V), the level of the DC voltage output from the rectification unit 122.

The switch unit 124 may be turned ON or OFF under the control of the control/communication unit 126. When the switch unit 124 is turned OFF, the control/communication unit 115 of the source device 110 may detect a reflected wave. Moreover, when the switch unit 124 is turned OFF, the magnetic coupling between the source resonator 116 and the target resonator 121 may be eliminated.

In some embodiments, the charging unit 125 may include at least one battery. The charging unit 125 may charge the at least one battery using a DC voltage output from the DC/DC converter 123.

The control/communication unit 126 may perform in-band communication for transmitting or receiving data using a resonance frequency, for instance. During the in-band communication, the control/communication unit 126 may demodulate a received signal by detecting a signal between the target resonator 121 and the rectification unit 122, or detecting an output signal of the rectification unit 122. The control/communication unit 126 may demodulate a message received using the in-band communication.

Additionally or alternatively, the control/communication unit 126 may adjust an impedance of the target resonator 121, to modulate a signal to be transmitted to the source device 110. The control/communication unit 126 may modulate the signal to be transmitted to the source device 110, for instance, by turning ON or OFF the switch unit 124. For example, the control/communication unit 126 may increase the impedance of the target resonator 121 so that a reflected wave may be detected from the control/communication unit 115 of the source device 110. For example, depending on whether the reflected wave is detected, the control/communication unit 115 may detect a binary number (e.g., "0" or "1.")

The control/communication unit 126 may be configured to transmit a response message to the wireless power transmitter. The response message may include, for example, a "type of a corresponding target device," "information on a manufacturer of a corresponding target device," "a model name of a corresponding target device," a "battery type of a corresponding target device," a "scheme of charging a corresponding target device," an "impedance value of a load of a corresponding target device," "information on characteristics of a target resonator of a corresponding target device," "information on a frequency band used by a corresponding target device," an "amount of a power consumed by a corresponding target device," an "identifier (ID) of a corresponding target device," or "information on version or standard of a corresponding target device."

The control/communication unit 126 may also perform out-band communication using a communication channel. The control/communication unit 126 may include a communication module, such as, one configured to process ZigBee, Bluetooth, Wi-Fi, Wi-Max and/or the like communications. The control/communication unit 126 may transmit or receive data to or from the source device 110 using the out-band communication, for instance.

The control/communication unit 126 may be configured to receive a wake-up request message from the wireless power transmitter, may detect an amount of a power received to the target resonator 121, and may transmit, to the wireless power transmitter, information on the detected amount of the power. The information on the detected amount may include, for example, an input voltage value and an input current value of the rectification unit 122, an output voltage value and an output current value of the rectification unit 122, an output voltage value and an output current value of the DC/DC converter 123, and the like.

The term "in-band" communication(s), as used herein, means communication(s) in which information (such as, for example, control information, data and/or metadata) is transmitted in the same frequency band, and/or on the same channel, as used for power transmission. According to one or more embodiments, the frequency may be a resonance frequency. And, the term "out-band" communication(s), as used herein, means communication(s) in which information (such as, for example, control information, data and/or metadata) is transmitted in a separate frequency band and/or using a separate or dedicated channel, than used for power transmission.

Figure 2:
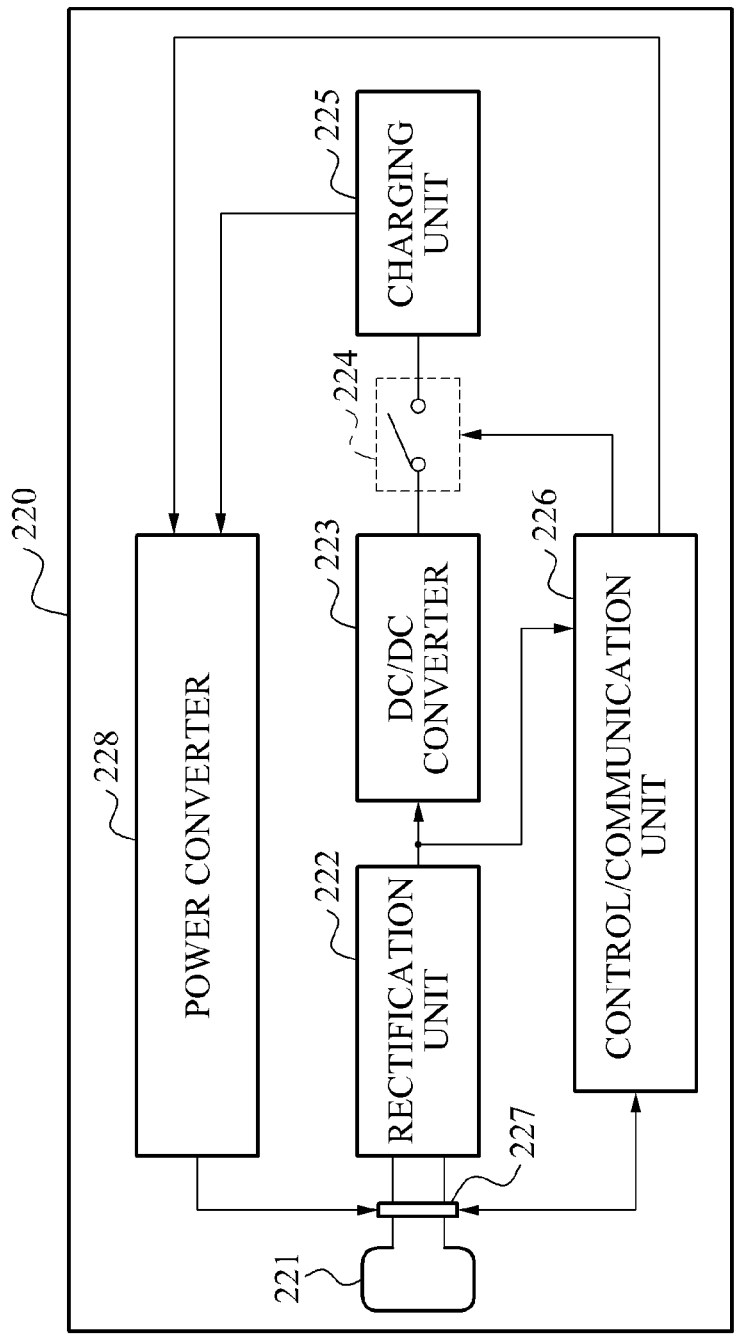
FIG. 2 is a diagram illustrating an electronic device.

FIG. 2 illustrates an electronic device 220.

As shown, the electronic device 220 includes a resonator 221, a power converter 228, a rectification unit 222, a DC/DC converter 223, a switch unit 224, a charging unit 225, a control/communication unit 226, and a path controller 227. The resonator 221 may be operated based on one of a plurality of operating modes of the electronic device 220 including a power reception mode, a relay mode, and a power transmission mode.

In the power reception mode, the resonator 221 may be configured as a target resonator so as to receive power from a wireless power transmitter (e.g., using a magnetic coupling). In the relay mode, the resonator 221 may be configured as a relay resonator so as to relay power received from the wireless power transmitter to a wireless power receiver. And, in the power transmission mode, the resonator 221 may be configured as a source resonator so as to transmit power to the wireless power receiver (e.g., using the magnetic coupling).

When the electronic device 220 receives a power from another electronic device the resonator 221 may be operated as a target resonator. One the other hand, when the electronic device 220 transmits a power to another electronic device, the resonator 221 may be operated as a source resonator.

In some embodiments, the electronic device 220 may be disposed between the wireless power transmitter and the wireless power receiver and the resonator 221 may be operated as a relay resonator. When the resonator 221 is used as a relay resonator, the resonator 221 may not be connected to the power converter 228 and the rectification unit 222, and may merely increase a range of magnetic coupling, a range of a wireless power transmission, or both.

The power converter 228 may perform the same or a similar function to the power converter 114 of FIG. 1. For example, when the electronic device 220 is operated in a power transmission mode, the power converter 228 may convert DC voltage to AC voltage using a resonance frequency, and may transfer the generated power to the resonator 221. And, the DC voltage may be supplied from the charging unit 225 to a power amplifier.

The rectification unit 222 may perform the same or a similar function to the rectification unit 122 of FIG. 1. For example, when the electronic device 220 is operated in a power reception mode, the rectification unit 222 may generate a DC signal by rectifying an AC signal received via the resonator 221.

The DC/DC converter 223 may perform the same or similar function as the DC/DC converter 123 of FIG. 1. Accordingly, the DC/DC converter 223 may supply voltage of a predetermined level to a load by adjusting a level of a DC signal.

The path controller 227 may be configured to control a connection of the resonator 221, the power converter 228 and the rectification unit 222, based on the operating mode of the electronic device 220.

The switch unit 224 and the charging unit 225 may be configured identical or similar to the switch unit 124 and the charging unit 125 of FIG. 1, respectively.

The control/communication unit 226 may perform a function of the control/communication unit 115 of FIG. 1, a function of the control/communication unit 126 of FIG. 1, or both. When the electronic device 220 is operated in the power transmission mode, the control/communication unit 226 may be configured to perform the function of the control/communication unit 115. On the other hand, when the electronic device 220 is operated in the power reception mode, the control/communication unit 226 may be configured to perform the function of the control/communication unit 126.

The control/communication unit 226 may perform a communication with the wireless power transmitter or the wireless power receiver, may determine the operating mode by the communication, and may control the path controller 227, based on the determined operating mode.

Figure 3A:
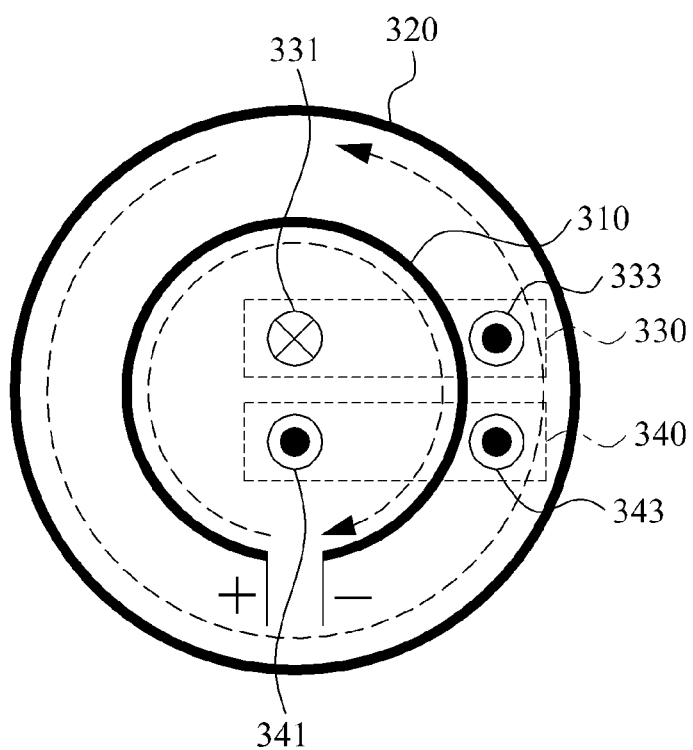
FIGS. 3A and 3B are diagrams illustrating a distribution of a magnetic field in a feeder and a source resonator.
Figure 3B:
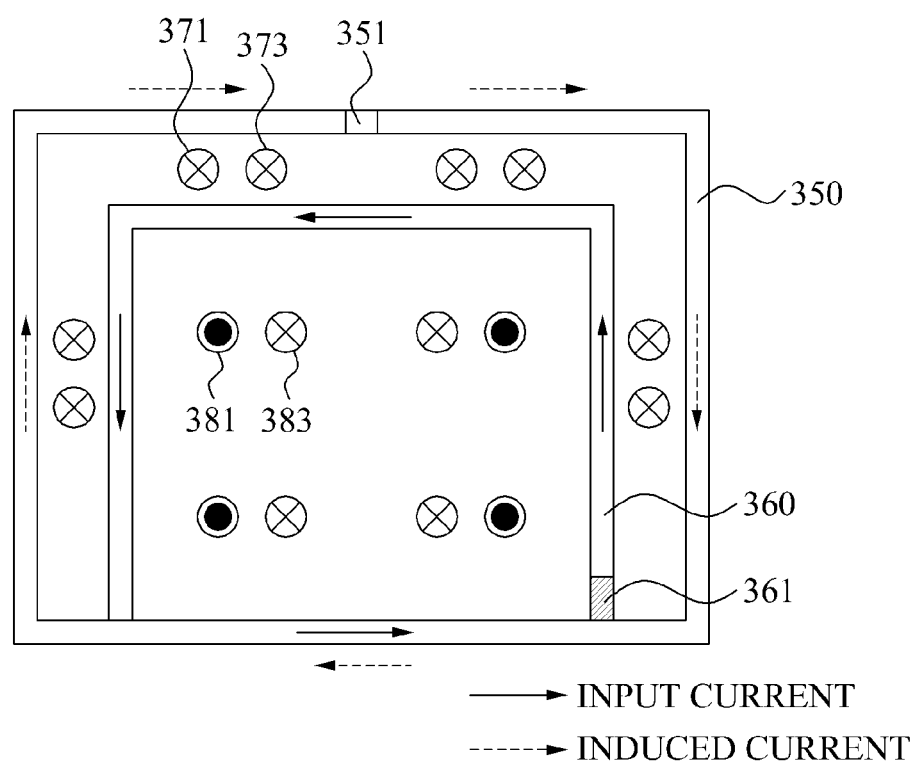

FIGS. 3A and 3B illustrate a distribution of a magnetic field in a feeder and a source resonator.

If a source resonator 320 may receive power through a separate feeder 310, magnetic fields may be formed in both the feeder and the source resonator.

Referring to FIG. 3A, as an input current flows in the feeder 310, a magnetic field 330 may be formed. The direction 331 of the magnetic field 330 within the feeder 310 may have a phase opposite to a phase of a direction 333 of the magnetic field 330 outside the feeder 310. The magnetic field 330 formed by the feeder 310 may cause an induced current to be formed in the source resonator 320. The direction of the induced current may be opposite to a direction of the input current.

Due to the induced current, a magnetic field 340 may be formed in the source resonator 320. Directions of a magnetic field formed due to an induced current in all positions of the source resonator 320 may be identical in some instances. Accordingly, the direction 341 of the magnetic field 340 formed by the source resonator 320 may have the same phase as a direction 343 of the magnetic field 340 formed by the source resonator 320.

Consequently, when the magnetic field 330 formed by the feeder 310 and the magnetic field 340 formed by the source resonator 320 are combined, the strength of the total magnetic field may decrease within the feeder 310; yet may increase outside the feeder 310. If power is supplied to the source resonator 320 through the feeder 310 configured as illustrated in FIG. 3, the strength of the total magnetic field may decrease in the center of the source resonator 320, but may increase outside the source resonator 320. And because the magnetic field may be randomly distributed in the source resonator 320, it may be difficult to perform impedance matching since the input impedance may frequently vary. Additionally, when the strength of the total magnetic field is increased, an efficiency of wireless power transmission may be increased. Conversely, when the strength of the total magnetic field is decreased, the efficiency for wireless power transmission may be reduced. Accordingly, the power transmission efficiency may be reduced on average.

In a target resonator, a magnetic field may be distributed as illustrated in FIG. 3A. Current flowing in the source resonator 320 may be induced by the input current flowing in the feeder 310. The current flowing in the target resonator may be induced by a magnetic coupling between the source resonator 320 and the target resonator. The current flowing in the target resonator may cause a magnetic field to be formed, so that an induced current may be generated in a feeder located in the target resonator. Within the feeder, a direction of a magnetic field formed by the target resonator may have a phase opposite to a phase of a direction of a magnetic field formed by the feeder and accordingly, strength of the total magnetic field may be reduced.

FIG. 3B illustrates a structure of a wireless power transmitter in which a source resonator 350 and a feeder 360 have a common ground. The source resonator 350 may include a capacitor 351, in some instances. The feeder 360 may receive an input of a radio frequency (RF) signal via a port 361.

For example, when the RF signal is received to the feeder 360, an input current may be generated in the feeder 360. The input current flowing in the feeder 360 may cause a magnetic field to be formed, and a current may be induced in the source resonator 350 by the magnetic field. Additionally, another magnetic field may be formed due to the induced current flowing in the source resonator 350. As shown, the direction of the input current flowing in the feeder 360 may have a phase opposite to a phase of the direction of the induced current flowing in the source resonator 350. Accordingly, in a region between the source resonator 350 and the feeder 360, the direction 371 of the magnetic field formed due to the input current may have the same phase as the direction 373 of the magnetic field formed due to the induced current, and thus the strength of the total magnetic field may increase. Conversely, within the feeder 360, the direction 381 of the magnetic field formed due to the input current may have a phase opposite to a phase of the direction 383 of the magnetic field formed due to the induced current, and thus the strength of the total magnetic field may decrease. Therefore, the strength of the total magnetic field may decrease in the center of the source resonator 350, yet may increase outside the source resonator 350.

The feeder 360 may determine the input impedance by adjusting an internal area of the feeder 360. The input impedance here may refer to impedance viewed in a direction from the feeder 360 to the source resonator 350. When the internal area of the feeder 360 is increased, the input impedance may be increased. Conversely, when the internal area of the feeder 360 is reduced, the input impedance may be reduced. Since the magnetic field may be randomly distributed in the source resonator 350 despite a reduction in the input impedance, a value of the input impedance may vary depending on a location of a target device. Accordingly, a separate matching network may be provided to match the input impedance to an output impedance of a power amplifier. For example, when the input impedance is increased, the separate matching network may be used to match the increased input impedance to relatively low output impedance.

In some implementations, such as, for example, when a target resonator has the same configuration as the source resonator 350, and when a feeder of the target resonator has the same configuration as the feeder 360, a separate matching network may be required, because a direction of a current flowing in the target resonator has a phase opposite to a phase of a direction of an induced current flowing in the feeder of the target resonator.

Figure 4A:
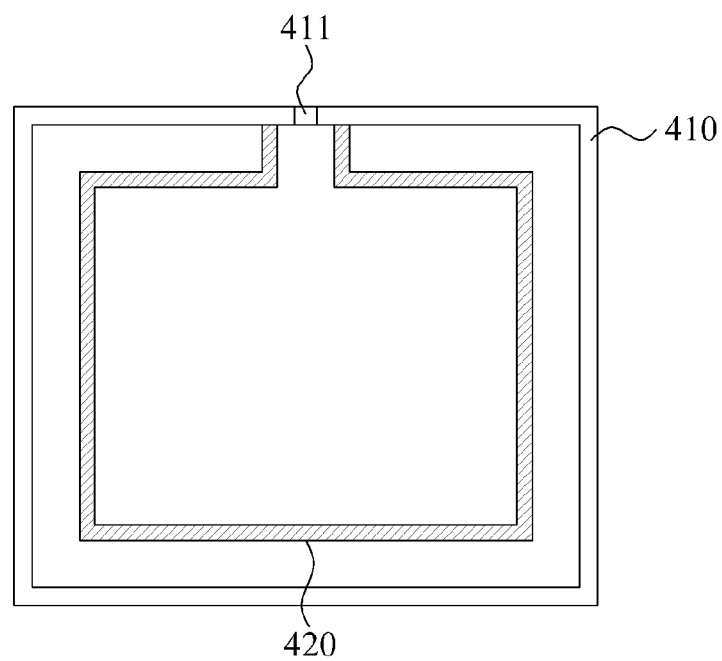
FIGS. 4A and 4B are diagrams illustrating a wireless power transmitter.

FIG. 4A illustrates a wireless power transmitter.

As shown in FIG. 4A, the wireless power transmitter may include a source resonator 410, and a feeding unit 420. The source resonator 410 may include at least one capacitor 411. The feeding unit 420 may be electrically connected to both ends of the at least one capacitor 411.

Figure 4B:
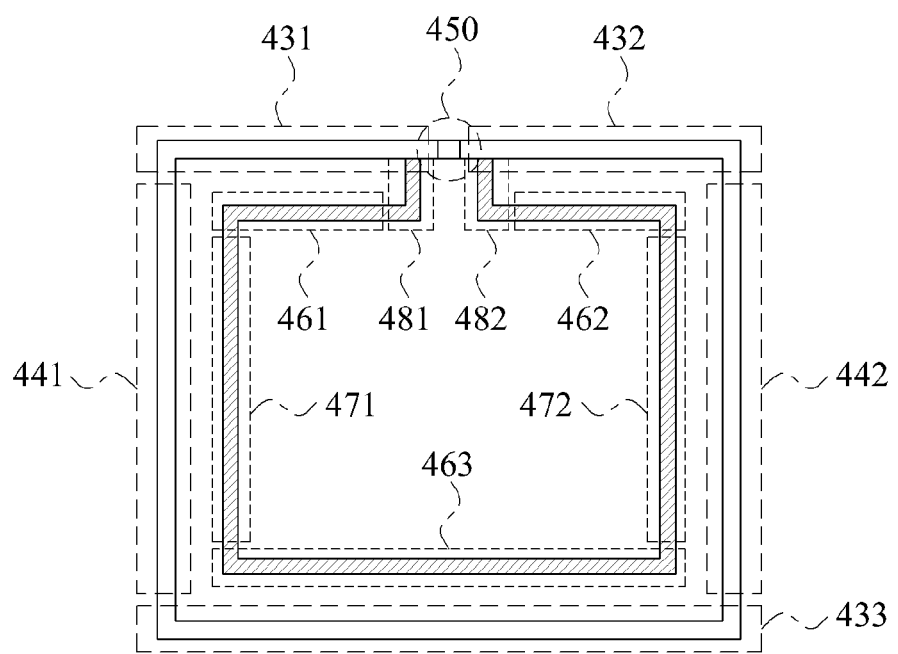

FIG. 4B illustrates, in more detail, the structure of the wireless power transmitter of FIG. 4A. The source resonator 410 may include a first transmission line, a first conductor 441, a second conductor 442, and at least one first capacitor 450. The first capacitor 450 may be inserted (e.g., in series) between a first signal conducting portion 431 and a second signal conducting portion 432 in the first transmission line, and an electric field may be confined within the first capacitor 450. For example, the first transmission line may include at least one conductor in an upper portion of the first transmission line, and may also include at least one conductor in a lower portion of the first transmission line. Current may flow through the at least one conductor disposed in the upper portion of the first transmission line, and the at least one conductor disposed in the lower portion of the first transmission line may be electrically grounded. For example, a conductor disposed in an upper portion of the first transmission line may be separated into and thereby be referred to as the first signal conducting portion 431 and the second signal conducting portion 432. A conductor disposed in a lower portion of the first transmission line may be referred to as a first ground conducting portion 433.

As shown in FIG. 4B, the source resonator 410 may have a generally two-dimensional (2D) structure. The first transmission line may include the first signal conducting portion 431 and the second signal conducting portion 432 in the upper portion of the first transmission line. In addition, the first transmission line may include the first ground conducting portion 433 in the lower portion of the first transmission line. The first signal conducting portion 431 and the second signal conducting portion 432 may be disposed to face the first ground conducting portion 433 with current flowing through the first signal conducting portion 431 and the second signal conducting portion 432.

Additionally, one end of the first signal conducting portion 431 may be electrically connected (i.e., shorted) to the first conductor 441, and another end of the first signal conducting portion 431 may be connected to the first capacitor 450. One end of the second signal conducting portion 432 may be electrically connected (i.e., shorted) to the second conductor 442, and another end of the second signal conducting portion 432 may be connected to the first capacitor 450. Accordingly, the first signal conducting portion 431, the second signal conducting portion 432, the first ground conducting portion 433, and the conductors 441 and 442 may be connected to each other, so that the source resonator 410 may have an electrically closed-loop structure. The term "closed-loop structure" as used herein, may include a polygonal structure, for example, a circular structure, a rectangular structure, or the like that is electrically closed.

The first capacitor 450 may be inserted into an intermediate portion of the first transmission line. For example, the first capacitor 450 may be inserted into a space between the first signal conducting portion 431 and the second signal conducting portion 432. The first capacitor 450 may be configured as a lumped element, a distributed element, or the like. For example, a distributed capacitor may include zigzagged conductor lines and a dielectric material that has a high permittivity between the zigzagged conductor lines.

When the first capacitor 450 is instead into the first transmission line, the source resonator 410 may have a characteristic of a metamaterial. The metamaterial indicates a material having a predetermined electrical property that has not been discovered in nature, and thus, may have an artificially designed structure. An electromagnetic characteristic of the materials existing in nature may have a unique magnetic permeability or a unique permittivity. Most materials may have a positive magnetic permeability or a positive permittivity.

In the case of most materials, a right hand rule may be applied to an electric field, a magnetic field, and a pointing vector, and thus, the corresponding materials may be referred to as right handed materials (RHMs). However, the metamaterial that has a magnetic permeability or a permittivity absent in nature may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

When a capacitance of the first capacitor 450 inserted as the lumped element is appropriately determined, the source resonator 410 may have the characteristic of the metamaterial. Because the source resonator 410 may have a negative magnetic permeability by appropriately adjusting the capacitance of the first capacitor 450, the source resonator 410 may also be referred to as an MNG resonator. Various criteria may be applied to determine the capacitance of the first capacitor 450. For example, the various criteria may include a criterion for enabling the source resonator 410 to have the characteristic of the metamaterial, a criterion for enabling the source resonator 410 to have a negative magnetic permeability in a target frequency, a criterion for enabling the source resonator 410 to have a zeroth order resonance characteristic in the target frequency, and/or the like. Based on at least one criterion among the aforementioned criteria, the capacitance of the first capacitor 450 may be determined.

The source resonator 410, also referred to as the MNG resonator 410, may have a zeroth order resonance characteristic of having, as a resonance frequency, a frequency when a propagation constant is "0". Because the source resonator 410 may have the zeroth order resonance characteristic, the resonance frequency may be independent with respect to a physical size of the MNG resonator 410. By appropriately designing the first capacitor 450, the MNG resonator 410 may sufficiently change the resonance frequency. Accordingly, the physical size of the MNG resonator 410 may not be changed.

In a near field, the electric field may be concentrated on the first capacitor 450 inserted into the first transmission line. Accordingly, due to the first capacitor 450, the magnetic field may become dominant in the near field. The MNG resonator 410 may have a relatively high Q-factor using the first capacitor 450 of the lumped element, and thus, it is possible to enhance an efficiency of power transmission. For example, the Q-factor may indicate a level of an ohmic loss or a ratio of a reactance with respect to a resistance in the wireless power transmission. The efficiency of the wireless power transmission may increase according to an increase in the Q-factor.

In some embodiments, a magnetic core may be further provided to pass through the MNG resonator 410. The magnetic core may increase the power transmission distance.

Referring to FIG. 4B, the feeding unit 420 may include a second transmission line, a third conductor 471, a fourth conductor 472, a fifth conductor 481, and a sixth conductor 482.

The second transmission line may include a third signal conducting portion 461 and a fourth signal conducting portion 462 in an upper portion of the second transmission line. In addition, the second transmission line may include a second ground conducting portion 463 in a lower portion of the second transmission line. The third signal conducting portion 461 and the fourth signal conducting portion 462 may be disposed to face the second ground conducting portion 463. Current may flow through the third signal conducting portion 461 and the fourth signal conducting portion 462.

Additionally, one end of the third signal conducting portion 461 may be shorted to the third conductor 471, and another end of the third signal conducting portion 461 may be connected to the fifth conductor 481. One end of the fourth signal conducting portion 462 may be shorted to the fourth conductor 472, and another end of the fourth signal conducting portion 462 may be connected to the sixth conductor 482. The fifth conductor 481 may be connected to the first signal conducting portion 431, and the sixth conductor 482 may be connected to the second signal conducting portion 432. The fifth conductor 481 and the sixth conductor 482 may be connected in parallel to both ends of the first capacitor 450. As shown, the fifth conductor 481 and the sixth conductor 482 may be used as input ports to receive an input of an RF signal.

Accordingly, the third signal conducting portion 461, the fourth signal conducting portion 462, the second ground conducting portion 463, the third conductor 471, the fourth conductor 472, the fifth conductor 481, the sixth conductor 482, and the source resonator 410 may be connected to each other so that the source resonator 410 and the feeding unit 420 may have an electrically closed-loop structure. When an RF signal is received via the fifth conductor 481 or the sixth conductor 482, an input current may flow in the feeding unit 420 and the source resonator 410, a magnetic field may be formed due to the input current, and a current may be induced to the source resonator 410 by the formed magnetic field. A direction of the input current flowing in the feeding unit 420 may be identical to a direction of the induced current flowing in the source resonator 410 and thus, strength of the total magnetic field may increase in the center of the source resonator 410, but may decrease outside the source resonator 410. The direction of the input current and the direction of the induced current will be further described with reference to FIGS. 5A and 5B.

An input impedance may be determined based on an area of a region between the source resonator 410 and the feeding unit 420 and accordingly, a separate matching network used to match the input impedance to an output impedance of a power amplifier may not be required. For example, even when the matching network is used, the input impedance may be determined by adjusting a size of the feeding unit 420 and thus, a structure of the matching network may be simplified. The simplified structure of the matching network may minimize a matching loss of the matching network.

The second transmission line, the third conductor 471, the fourth conductor 472, the fifth conductor 481, and the sixth conductor 482 may form the same structure as the source resonator 410. When the source resonator 410 has a loop structure, the feeding unit 420 may also have a loop structure. For example, if the source resonator 410 has a circular structure, the feeding unit 420 may also have a circular structure.

The above-described configuration of the source resonator 410 and configuration of the feeding unit 420 may be similarly applied to the target resonator and the feeding unit of the target resonator, respectively. When the feeding unit of the target resonator is configured as described above, the feeding unit may match an output impedance of the target resonator and an input impedance of the feeding unit, by adjusting a size of the feeding unit. Accordingly, a separate matching network may not be used.

Figure 5A:
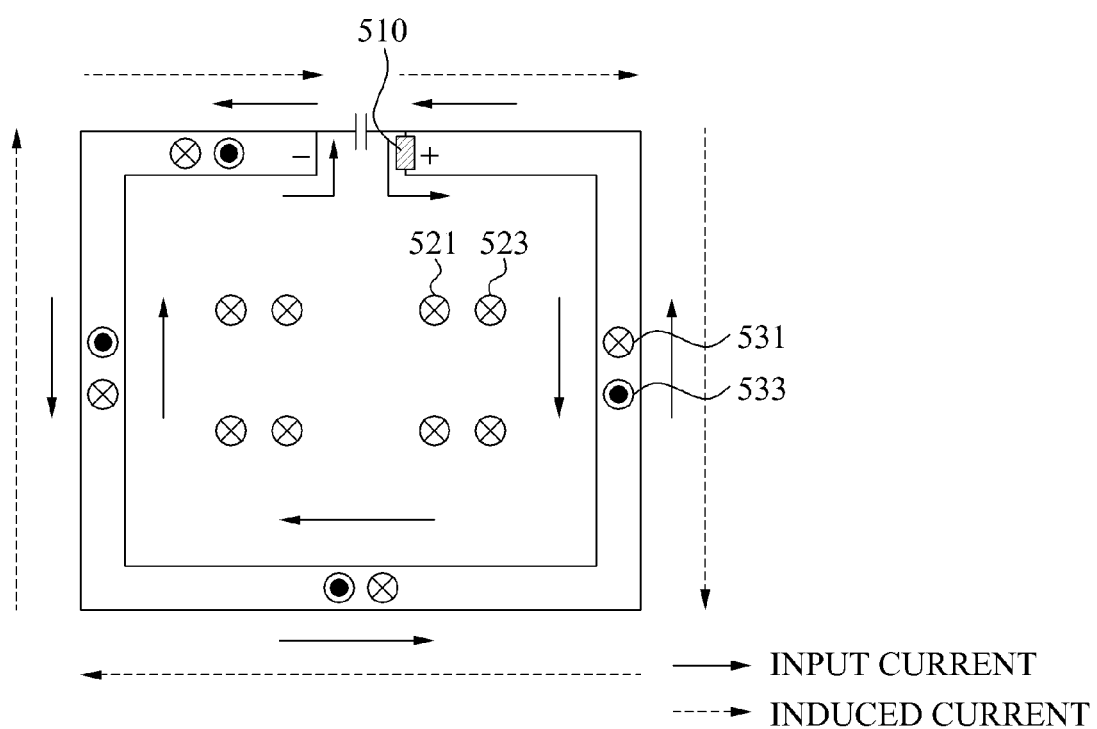
FIG. 5A is a diagram illustrating a distribution of a magnetic field within a source resonator based on feeding of a feeding unit.
Figure 5B:
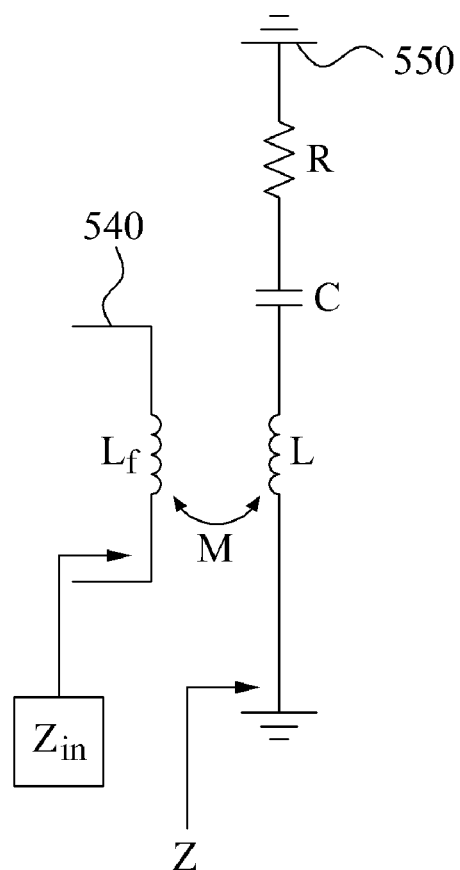
FIG. 5B is a diagram illustrating equivalent circuits of a feeding unit and a source resonator.

FIG. 5A illustrates a distribution of a magnetic field within a source resonator based on feeding of a feeding unit. FIG. 5B illustrates an equivalent circuit of a feeding unit 540, and an equivalent circuit of a source resonator 550.

As used herein, a feeding operation may refer to supplying a power to a source resonator in a wireless power transmitter, or refer to supplying an AC power to a rectification unit in a wireless power receiver. FIG. 5A illustrates a direction of an input current flowing in the feeding unit, and a direction of an induced current induced in the source resonator. Additionally, FIG. 5A illustrates a direction of a magnetic field formed due to the input current of the feeding unit, and a direction of a magnetic field formed due to the induced current of the source resonator.

Referring to FIG. 5A, a fifth conductor or a sixth conductor of the feeding unit may be used as an input port 510. The input port 510 may receive an input of an RF signal. The RF signal may be output from a power amplifier. The power amplifier may increase or decrease the amplitude of the RF signal, on demand by a target device. The RF signal received by the input port 510 may form an input current flowing in the feeding unit, with the input current flowing in a clockwise direction in the feeding unit, along a transmission line of the feeding unit, for instance. The fifth conductor of the feeding unit may be electrically connected to the source resonator. In one embodiment, the fifth conductor may be connected to a first signal conducting portion of the source resonator. Accordingly, the input current may flow in the source resonator, as well as, in the feeding unit.

The input current may flow in a counterclockwise direction in the source resonator. The input current flowing in the source resonator may cause a magnetic field to be formed so that an induced current may be generated in the source resonator due to the magnetic field. The induced current may flow in a clockwise direction in the source resonator. Here, the induced current may transfer energy to a capacitor of the source resonator, and a magnetic field may be formed due to the induced current. The input current flowing in the feeding unit and the source resonator may be indicated by a solid line of FIG. 5A, and the induced current flowing in the source resonator may be indicated by a dotted line of FIG. 5A.

The direction of a magnetic field formed due to a current may be determined based on the right hand rule. As illustrated in FIG. 5A, within the feeding unit, the direction 521 of a magnetic field formed due to the input current flowing in the feeding unit may be identical to the direction 523 of a magnetic field formed due to the induced current flowing in the source resonator. Accordingly, strength of the total magnetic field may increase within the feeding unit.

Additionally, in a region between the feeding unit and the source resonator, the direction 533 of a magnetic field formed due to the input current flowing in the feeding unit has a phase opposite to the phase of a direction 531 of a magnetic field formed due to the induced current flowing in the source resonator, as illustrated in FIG. 5A. Accordingly, the strength of the total magnetic field may decrease in the region between the feeding unit and the source resonator.

Typically, the strength of a magnetic field decreases in the center of a source resonator with the loop structure, and increases outside the source resonator. However, referring to FIG. 5A, the feeding unit may be electrically connected to both ends of a capacitor of the source resonator, and accordingly the induced current of the source resonator may flow in the same direction as the input current of the feeding unit. Since the induced current of the source resonator flows in the same direction as the input current of the feeding unit, the strength of the total magnetic field may increase within the feeding unit, and may decrease outside the feeding unit. As a result, the strength of the total magnetic field may increase in the center of the source resonator with the loop structure, and may decrease outside the source resonator, due to the feeding unit. Thus, the strength of the total magnetic field may be equalized within the source resonator. Additionally, the power transmission efficiency for transferring a power from the source resonator to a target resonator may be in proportion to the strength of the total magnetic field formed in the source resonator. And when the strength of the total magnetic field increases in the center of the source resonator, the power transmission efficiency may also increase.

Referring to FIG. 5B, the feeding unit 540 and the source resonator 550 may be expressed by the equivalent circuits. Input impedance $Z_{in}$, viewed in a direction from the feeding unit 540 to the source resonator 550, may be computed according to Equation 1 as follows:

$$Z_{in} = \frac{(\omega M)^2}{Z} \qquad \text{[Equation 1]}$$

In Equation 1, M denotes a mutual inductance between the feeding unit 540 and the source resonator 550, ω denotes a resonance frequency between the feeding unit 540 and the source resonator 550, and Z denotes the impedance viewed in a direction from the source resonator 550 to a target device. The input impedance $Z_{in}$ may be in proportion to the mutual inductance M. Accordingly, the input impedance $Z_{in}$ may be controlled by adjusting the mutual inductance M. The mutual inductance M may be adjusted based on an area of a region between the feeding unit 540 and the source resonator 550. The area of the region between the feeding unit 540 and the source resonator 550 may be adjusted based on a size of the feeding unit 540. And, the input impedance $Z_{in}$ may be determined based on the size of the feeding unit 540. Thus, a separate matching network may not be required to perform impedance matching with an output impedance of a power amplifier.

In a target resonator and a feeding unit included in a wireless power receiver, a magnetic field may be distributed as illustrated in FIG. 5A. For example, the target resonator may receive a wireless power from a source resonator, using magnetic coupling. Due to the received wireless power, an induced current may be generated in the target resonator. A magnetic field formed due to the induced current in the target resonator may cause another induced current to be generated in the feeding unit. When the target resonator is connected to the feeding unit as illustrated in FIG. 5A, the induced current generated in the target resonator may flow in the same direction as the induced current generated in the feeding unit. Thus, strength of the total magnetic field may increase within the feeding unit, but may decrease in a region between the feeding unit and the target resonator.

Figure 6:
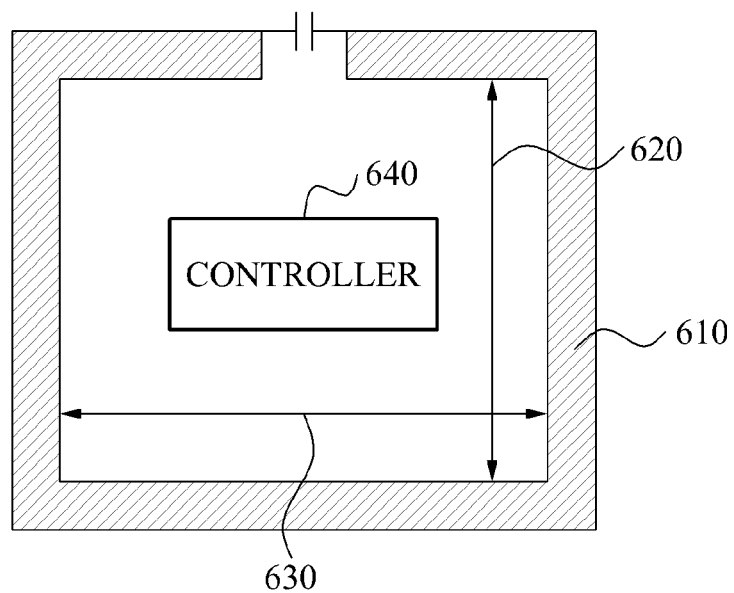
FIG. 6 is a diagram illustrating another wireless power transmitter.

FIG. 6 illustrates another wireless power transmitter.

A controller 640 may adjust a mutual inductance M between the feeding unit and the source resonator, by adjusting an area of a region 610 between a feeding unit and a source resonator. By adjusting the mutual inductance M, the controller 640 may determine a value of an input impedance $Z_{in}$. The area of the region 610 may be adjusted by controlling a size of the feeding unit. The size of the feeding unit may be determined based on a distance 620 between a fourth signal conducting portion and a second ground conducting portion, or based on a distance 630 between a third conductor and a fourth conductor.

When the area of the region 610 is increased, the mutual inductance M may be increased. Conversely, when area of the region 610 is reduced, the mutual inductance M may be reduced. The controller 640 may be configured to determine the value of the input impedance $Z_{in}$, by adjusting the size of the feeding unit. For example, in various embodiments, the value of the input impedance $Z_{in}$ may be adjusted from about 1 ohm (Ω) to 3000Ω, based on the size of the feeding unit. Accordingly, the controller 640 may match the input impedance $Z_{in}$ to an output impedance of a power amplifier, based on the size of the feeding unit. In some instances, the controller 640 may not need to employ a separate matching network to perform impedance matching between the input impedance 4, and the output impedance of the power amplifier. For example, when the output impedance of the power amplifier has a value of 50Ω, the controller 640 may adjust the input impedance $Z_{in}$ to 50Ω, by adjusting the size of the feeding unit. Additionally, even if a matching network is used for an efficiency of matching, the controller 640 may minimize a loss of power transmission efficiency by simplifying a structure of the matching network.

The controller 640 may control a magnetic field formed in the source resonator to be uniformly distributed, based on a direction of an induced current flowing in the source resonator, and a direction of an input current flowing in the feeding unit. Since the feeding unit and the source resonator are electrically connected to both ends of a capacitor, the induced current may be flow in the source resonator in the same direction as the input current. The controller 640 may adjust the size of the feeding unit based on distribution of the magnetic field in the source resonator, to strengthen a portion of the magnetic field with a low strength, or to weaken a portion of the magnetic field with a high strength, so that the magnetic field may be uniformly distributed. This is because the controller 640 may enable strength of the total magnetic field to increase within the feeding unit, and enable the strength of the magnetic field to decrease in the region 610 between the feeding unit and the source resonator.

When the magnetic field is uniformly distributed in the source resonator, the source resonator may have a constant input impedance value. Due to the constant input impedance value, the wireless power transmitter may prevent the power transmission efficiency from being reduced, and may effectively transmit a power to the target device, regardless of a location of the target device on the source resonator.

A wireless power receiver may also include a target resonator, a feeding unit, and a controller. The controller may control an output impedance of the target resonator, by adjusting a size of the feeding unit. The controller 640 may be configured to match the output impedance of the target resonator to an input impedance of the feeding unit, by adjusting an area of a region between the target resonator and the feeding unit. The output impedance of the target resonator may refer to impedance viewed in a direction from the target resonator to the source resonator. The input impedance of the feeding unit may refer to an impedance viewed in a direction from the feeding unit to a load.

FIG. 7 illustrates still another wireless power transmitter.

Referring to FIG. 7, source resonators 720 and 740 may be implemented as spiral resonators. Each of the spiral resonators may be configured by winding a coil a plurality of times (e.g., "n" times) in a generally spiral shape.

In FIG. 7, a feeding unit 710 may be disposed in the source resonator 720, in particular, in an innermost turn of the coil wound in the spiral shape. The feeding unit 710 may include an input port 711 that receives an input of an RF signal, and may enable an input current to flow in the feeding unit 710. The input current may also flow in the source resonator 720, and may cause a magnetic field to be formed. Additionally, the magnetic field may enable an induced current to be generated in the source resonator 720 in the same direction as the input current.

One of both of the source resonators 720 and 740 may include a capacitor. The capacitor may be electrically connected between a winding starting end of the coil and a winding finishing end of the coil.

Additionally, a feeding unit 730 may be disposed around the source resonator 740. As shown, the feeding unit 730 may be positioned outside of the outermost turn of the coil wound in the spiral shape. The feeding unit 730 may include an input port 731. The input port 731 may receive an input of an RF signal, and may enable an input current to flow in the feeding unit 730. The input current may also flow in the source resonator 740, and may cause a magnetic field to be formed. Additionally, the magnetic field may enable an induced current to be generated in the source resonator 740 in the same direction as the input current.

A source resonator may be formed in various shapes, for example, a meta-resonator, a coil resonator, a spiral resonator, a helical resonator, or the like. Additionally, a feeding unit enabling an induced current to be generated in the source resonator may be located within or outside the source resonator with the various shapes. For instance, the feeding unit may be electrically connected to both ends of a capacitor included in the source resonator. Portions of the feeding unit that are electrically connected to both ends of the capacitor may not enable an input current to pass directly through the capacitor. The input current may flow through a loop formed by the feeding unit and the source resonator.

FIGS. 8A through 13B illustrate various resonators. A source resonator included in a wireless power transmitter, and a target resonator included in a wireless power receiver may be configured as illustrated in FIGS. 8A through 13B, for instance.

Figure 8A:
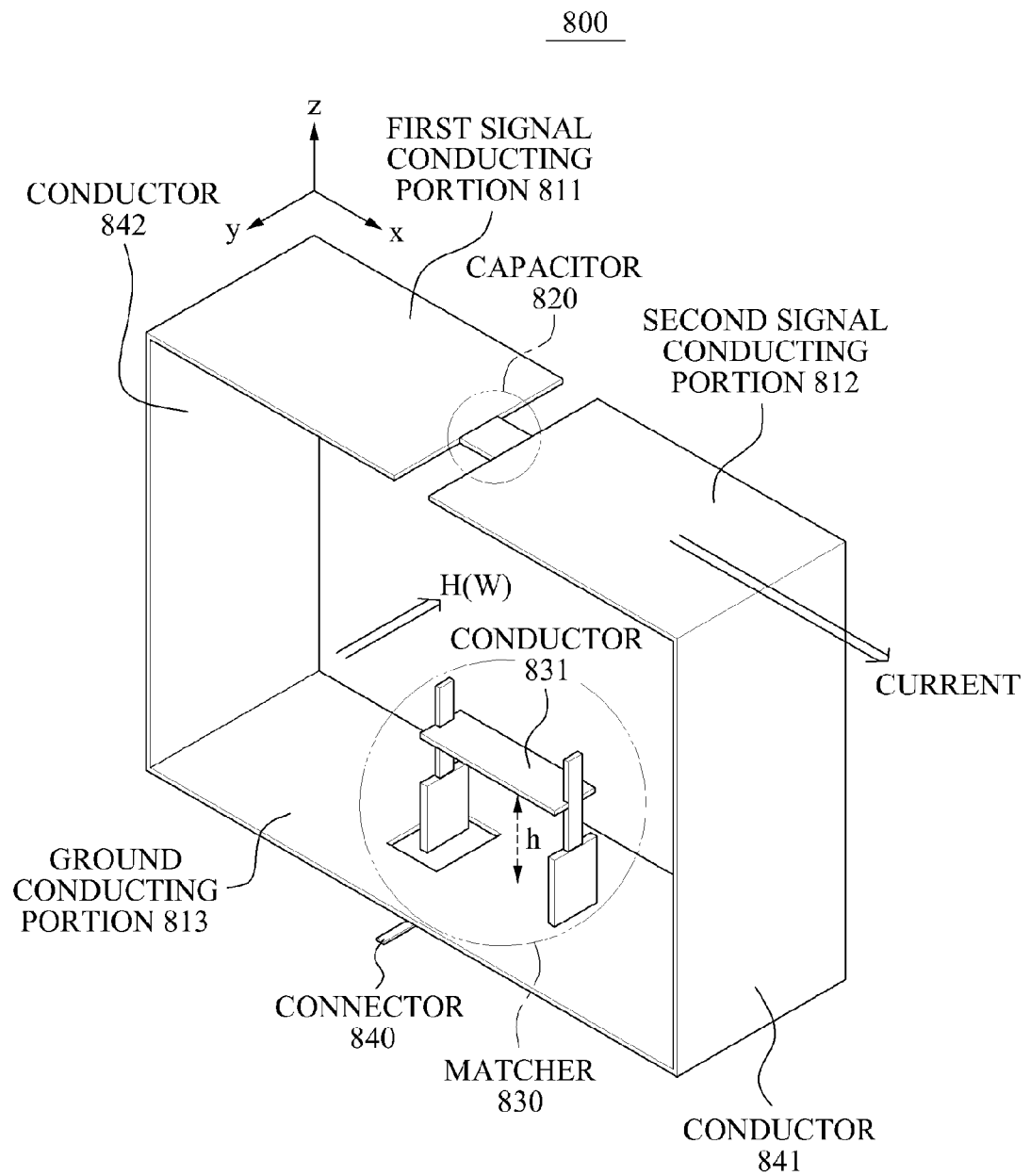
FIGS. 8A through 13B are diagrams illustrating various resonators.
Figure 8B:
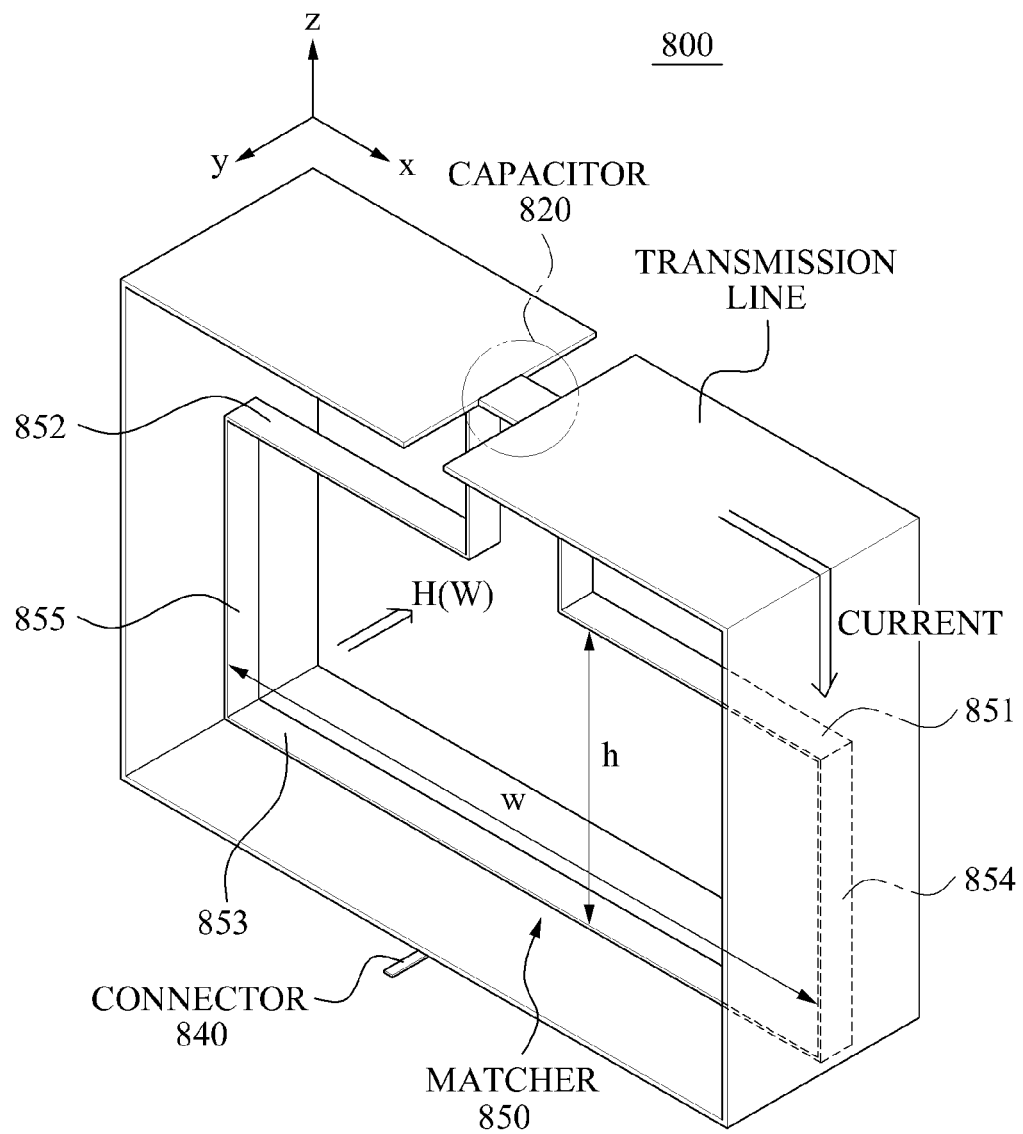

FIGS. 8A and 8B illustrate examples of a resonator having a three-dimensional (3D) structure.

Referring to FIG. 8A, a resonator 800 having the 3D structure may include a transmission line and a capacitor 820. The transmission line may include a first signal conducting portion 811, a second signal conducting portion 812, and a ground conducting portion 813. The capacitor 820 may be inserted, for instance, in series between the first signal conducting portion 811 and the second signal conducting portion 812 of the transmission link such that an electric field may be confined within the capacitor 820.

As illustrated in FIG. 8A, the resonator 800 may have a generally 3D structure. The transmission line may include the first signal conducting portion 811 and the second signal conducting portion 812 in an upper portion of the resonator 800, and may include the ground conducting portion 813 in a lower portion of the resonator 800. The first signal conducting portion 811 and the second signal conducting portion 812 may be disposed to face the ground conducting portion 813. In this arrangement, current may flow in an x direction through the first signal conducting portion 811 and the second signal conducting portion 812. Due to the current, a magnetic field H(W) may be formed in a −y direction. However, it will be appreciated that the magnetic field H(W) might also be formed in the opposite direction (e.g., a +y direction) in other implementations.

In one or more embodiments, one end of the first signal conducting portion 811 may be electrically connected to (i.e., shorted) to a conductor 842, and another end of the first signal conducting portion 811 may be connected to the capacitor 820. One end of the second signal conducting portion 812 may be grounded to a conductor 841, and another end of the second signal conducting portion 812 may be connected to the capacitor 820. Accordingly, the first signal conducting portion 811, the second signal conducting portion 812, the ground conducting portion 813, and the conductors 841 and 842 may be connected to each other, whereby the resonator 800 may have an electrically closed-loop structure.

As illustrated in FIG. 8A, the capacitor 820 may be inserted or otherwise positioned between the first signal conducting portion 811 and the second signal conducting portion 812. The capacitor 820 may include, for example, a lumped element, a distributed element, or the like. In one implementation, a distributed capacitor having the shape of the distributed element may include zigzagged conductor lines and a dielectric material having a relatively high permittivity positioned between the zigzagged conductor lines.

When the capacitor 820 is inserted into the transmission line, the resonator 800 may have a characteristic of a metamaterial, in some instances.

For example, when the capacitance of the capacitor inserted as a lumped element is appropriately determined, the resonator 800 may have the characteristic of the metamaterial. When the resonator 800 has a negative magnetic permeability by appropriately adjusting the capacitance of the capacitor 820, the resonator 800 may also be referred to as an MNG resonator. Various criteria may be applied to determine the capacitance of the capacitor 820. For example, the various criteria may include one or more of the following: a criterion to enable the resonator 800 to have the characteristic of the metamaterial, a criterion to enable the resonator 800 to have a negative magnetic permeability in a target frequency, a criterion to enable the resonator 800 to have a zeroth order resonance characteristic in the target frequency, and/or the like. Based on at least one criterion among the aforementioned criteria, the capacitance of the capacitor 820 may be determined.

The resonator 800, also referred to as the MNG resonator 800, may have a zeroth order resonance characteristic (i.e., having, as a resonance frequency, a frequency when a propagation constant is "0"). If the resonator 800 has a zeroth order resonance characteristic, the resonance frequency may be independent with respect to a physical size of the MNG resonator 800. Thus, by appropriately designing the capacitor 820, the MNG resonator 800 may sufficiently change the resonance frequency without substantially changing the physical size of the MNG resonator 800.

Referring to the MNG resonator 800 of FIG. 8A, in a near field, the electric field may be concentrated on the capacitor 820 inserted into the transmission line. Accordingly, due to the capacitor 820, the magnetic field may become dominant in the near field. And, since the MNG resonator 800 having the zeroth-order resonance characteristic may have characteristics similar to a magnetic dipole, the magnetic field may become dominant in the near field. A relatively small amount of the electric field formed due to the insertion of the capacitor 820 may be concentrated on the capacitor 820 and thus, the magnetic field may become further dominant. The MNG resonator 800 may have a relatively high Q-factor using the capacitor 820 of the lumped element and thus, it is possible to enhance an efficiency of power transmission.

Also, the MNG resonator 800 may include a matcher 830 to be used in impedance matching. The matcher 830 may be configured to appropriately adjust the strength of the magnetic field of the MNG resonator 800. The impedance of the MNG resonator 800 may be determined by the matcher 830. In one or more embodiments, current may flow in the MNG resonator 800 via a connector 840, or may flow out from the MNG resonator 800 via the connector 840. And the connector 840 may be connected to the ground conducting portion 813 or the matcher 830.

As illustrated in FIG. 8A, the matcher 830 may be positioned within the loop formed by the loop structure of the resonator 800. The matcher 830 may be configured to adjust the impedance of the resonator 800 by changing the physical shape of the matcher 830. For example, the matcher 830 may include a conductor 831 to be used in the impedance matching in a location separate from the ground conducting portion 813 by a distance h. The impedance of the resonator 800 may be changed by adjusting the distance h.

In some embodiments, a controller may be provided to control the matcher 830. In this case, the matcher 830 may change the physical shape of the matcher 830 based on a control signal generated by the controller. For example, the distance h between the conductor 831 of the matcher 830 and the ground conducting portion 813 may be increased or decreased based on the control signal. Accordingly, the physical shape of the matcher 830 may be changed such that the impedance of the resonator 800 may be adjusted. The distance h between the conductor 831 of the matcher 830 and the ground conducting portion 813 may be adjusted using a variety of schemes. Alternatively or additionally, a plurality of conductors may be included in the matcher 830 and the distance h may be adjusted by adaptively activating one of the conductors. For instance, the distance h may be adjusted by adjusting the physical location of the conductor 831 up and down. The distance h may be controlled based on the control signal of the controller. The controller may generate the control signal using various factors.

As illustrated in FIG. 8A, the matcher 830 may be configured as a passive element such as the conductor 831, for instance. Of course, in other embodiments, the matcher 830 may be configured as an active element such as a diode, a transistor, or the like. When the active element is included in the matcher 830, the active element may be driven based on the control signal generated by the controller, and the impedance of the resonator 800 may be adjusted based on the control signal. For example, if the active element is a diode included in the matcher 830, the impedance of the resonator 800 may be adjusted depending on whether the diode is in an ON state or in an OFF state.

In some embodiments, a magnetic core may be further provided to pass through the resonator 800 configured as the MNG resonator 800. The magnetic core may perform a function of increasing a power transmission distance.

In addition, the resonator 800 may include a matcher 850 for impedance matching, as illustrate in FIG. 8B. The matcher 850 may include a transmission line, and conductors 854 and 855. The transmission line may include a third signal conducting portion 851, a fourth signal conducting portion 852, and a ground conducting portion 853. The conductor 854 may connect the third signal conducting portion 851 and the ground conducting portion 853, and the conductor 855 may connect the fourth signal conducting portion 852 and the ground conducting portion 853. The third signal conducting portion 851 and the fourth signal conducting portion 852 may be connected to both ends of the capacitor 820 of the resonator 800.

Additionally, one end of the third signal conducting portion 851 may be shorted to the conductor 854, and another end of the third signal conducting portion 851 may be connected to one end of the capacitor 820. One end of the fourth signal conducting portion 852 may be electrically connected (e.g., shorted) to the conductor 855, and another end of the fourth signal conducting portion 852 may be connected to another end of the capacitor 820.

Accordingly, the matcher 850 and the resonator 800 may be connected to each other, whereby the resonator 800 may have an electrically closed-loop structure. The matcher 850 may appropriately adjust strength of a magnetic field in the resonator 800. An impedance of the resonator 800 may be determined by the matcher 850. Additionally, a current may flow into and/or out of the resonator 800 via the connector 840. The connector 840 may be connected to the matcher 850. For instance, the connector 840 may be connected to the third signal conducting portion 851 or the fourth signal conducting portion 852. The current flowing into the resonator 800 via the connector 840 may cause an induced current to be generated in the resonator 800. Accordingly, the direction of a magnetic field formed by the resonator 800 may be identical to the direction of a magnetic field formed by the matcher 850 and thus, the strength of the total magnetic field may increase within the matcher 850. Conversely, the direction of a magnetic field formed by the resonator 800 may be opposite to the direction of a magnetic field formed by the matcher 850 and thus, the strength of the total magnetic field may decrease outside the matcher 850.

The matcher 850 may adjust an impedance of the resonator 800 by changing the physical shape of the matcher 850. For example, the matcher 850 may include the third signal conducting portion 851 and the fourth signal conducting portion 852 for the impedance matching in a location that is separated from the ground conducting portion 853 by a distance h. The impedance of the resonator 800 may be changed by adjusting the distance h.

In some embodiments, a controller may be provided to control the matcher 850. For example, the matcher 850 may be configured to change the physical shape of the matcher 850 based on a control signal generated by the controller. For example, the distance h between the ground conducting portion 853, and the third signal conducting portion 851 and the fourth signal conducting portion 852 of the matcher 850 may increase or decrease based on the control signal. Accordingly, the physical shape of the matcher 850 may be changed, and the impedance of the resonator 800 may be adjusted. The distance h between the ground conducting portion 853, and the third signal conducting portion 851 and the fourth signal conducting portion 852 of the matcher 850 may be adjusted using a variety of schemes. As one example, a plurality of conductors may be included in the matcher 850 and the distance h may be adjusted by adaptively activating one of the conductors. As another example, the distance h may be adjusted by adjusting the physical locations of the third signal conducting portion 851 and the fourth signal conducting portion 852 up and down. The distance h may be controlled based on the control signal of the controller. The controller may generate the control signal using various factors. Additionally, a distance w between the conductors 854 and 855 of the matcher 850 may increase or decrease based on the control signal. Accordingly, the physical shape of the matcher 850 may be changed and the impedance of the resonator 800 may be adjusted.

Figure 9A:
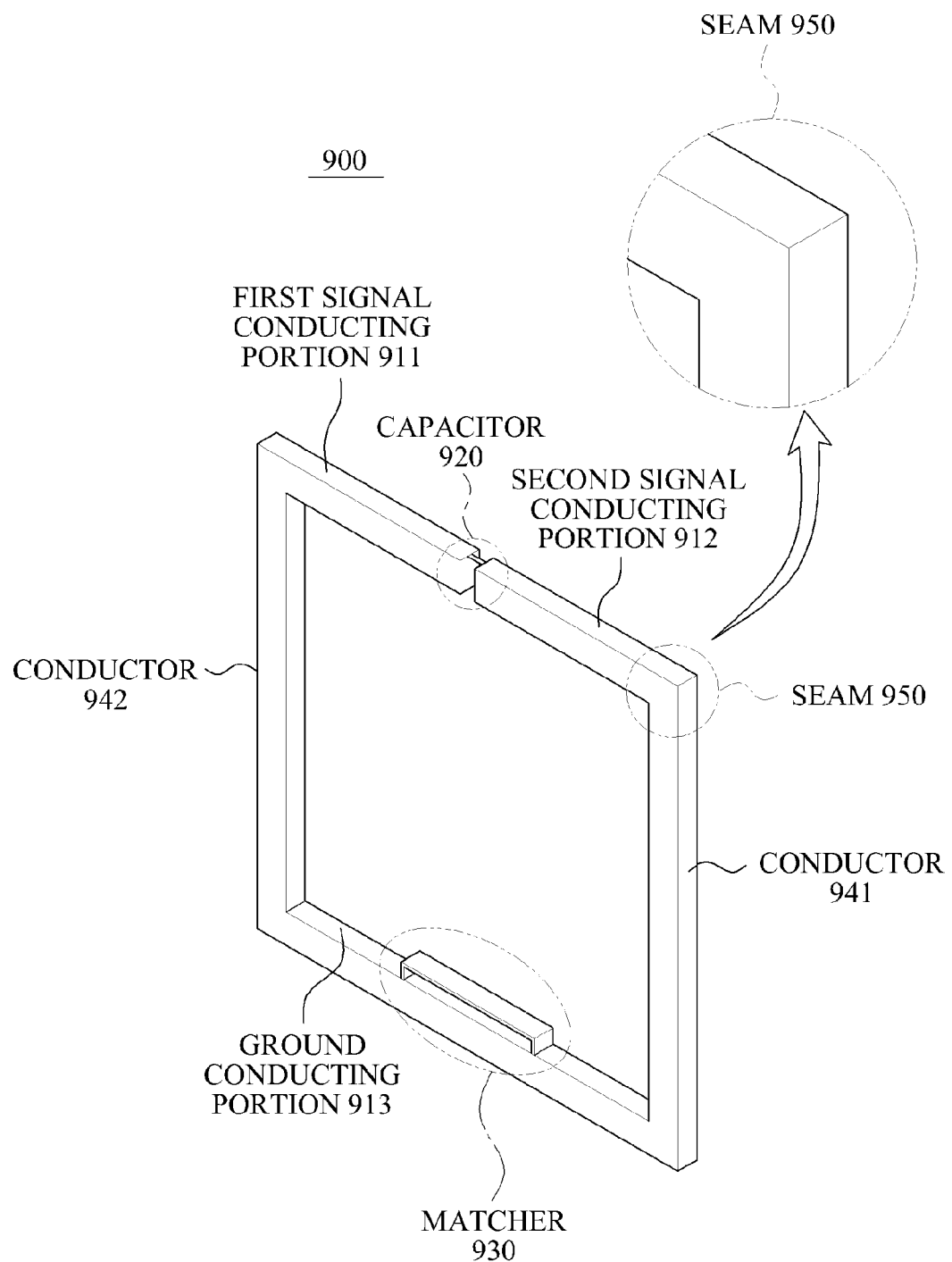
Figure 9B:
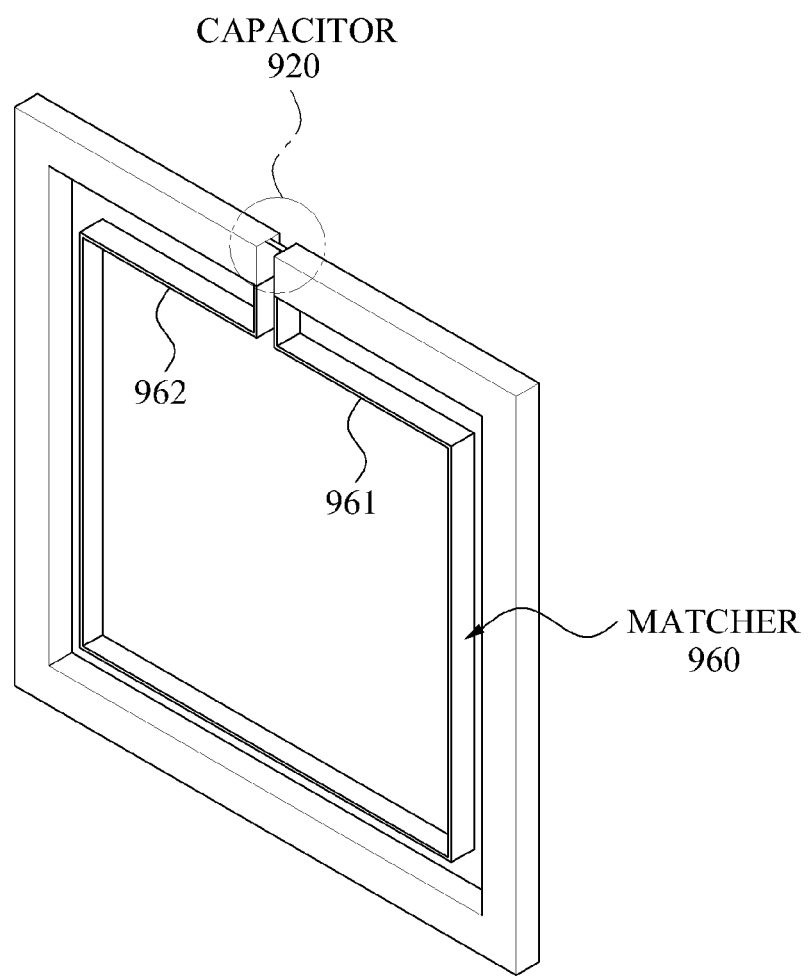

FIGS. 9A and 9B illustrate examples of a bulky-type resonator for wireless power transmission.

Referring to FIG. 9A, a first signal conducting portion 911 and a conductor 942 may be integrally formed, rather than being separately manufactured and being connected to each other. Similarly, a second signal conducting portion 912 and a conductor 941 may also be integrally manufactured.

When the second signal conducting portion 912 and the conductor 941 are separately manufactured and then are connected to each other, a loss of conduction may occur due to a seam 950. Thus, in some implementations, the second signal conducting portion 912 and the conductor 941 may be connected to each other without using a separate seam (i.e., seamlessly connected to each other). Additionally, the conductor 941 and a ground conducting portion 913 may be seamlessly connected to each other. Accordingly, it is possible to decrease a conductor loss caused by the seam 950. For instance, the second signal conducting portion 912 and the ground conducting portion 913 may be seamlessly and integrally manufactured. Similarly, the first signal conducting portion 911, the conductor 942 and the ground conducting portion 913 may be seamlessly and integrally manufactured.

Referring to FIG. 9A, a type of a seamless connection connecting at least two partitions into an integrated form is referred to as a bulky type.

As used herein, the term "bulky type" may refer to a seamless connection connecting at least two parts in an integrated form.

The resonator 900 may include a matcher 930, as illustrated in FIG. 9A. For example, the resonator 900 may include a matcher 960, as illustrated in FIG. 9B, with, conduction portions 961 and 962 of the matcher 960 may be connected to the capacitor 920.

Figure 10A:
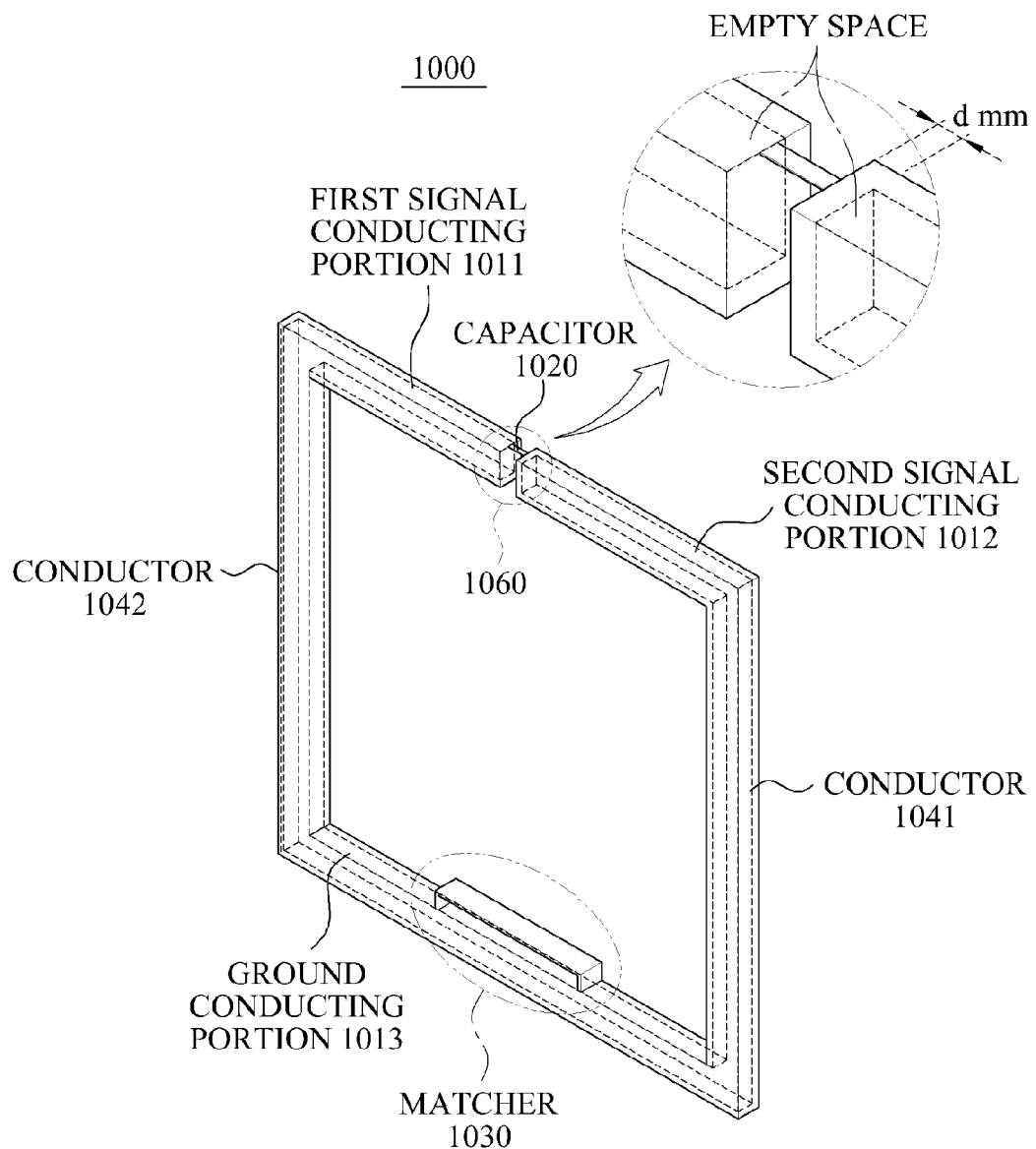
Figure 10B:
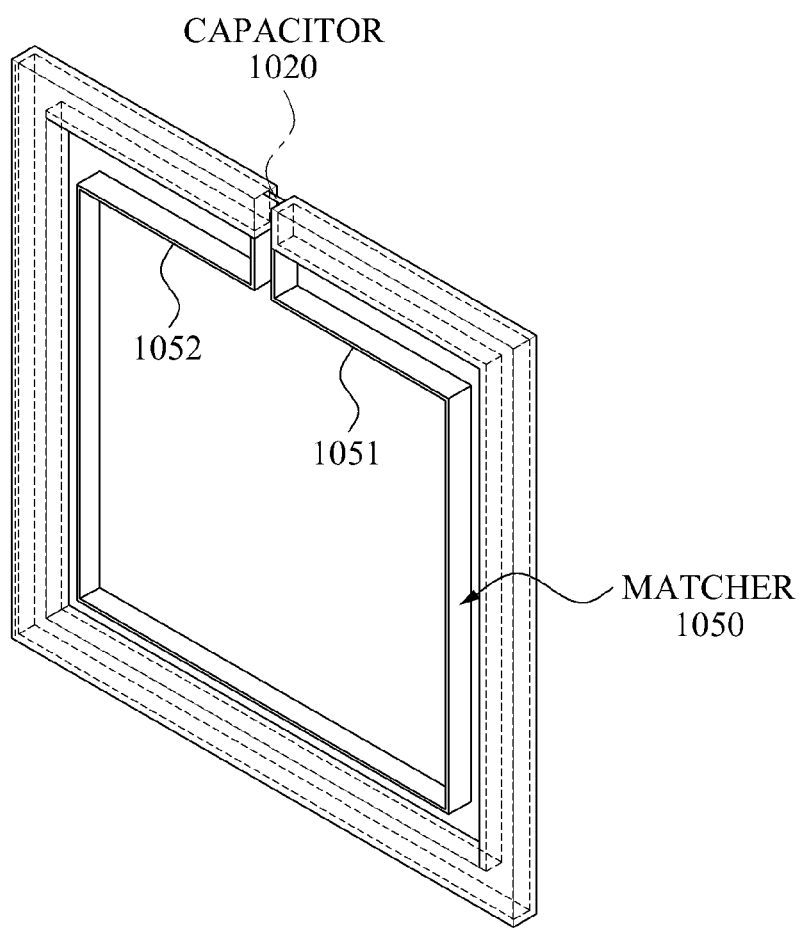

FIGS. 10A and 10B illustrate a hollow-type resonator for wireless power transmission.

Referring to FIG. 10A, each of a first signal conducting portion 1011, a second signal conducting portion 1012, a ground conducting portion 1013, and conductors 1041 and 1042 of a resonator 1000 configured as the hollow type structure. As used herein, the term "hollow type" refers to a configuration that may include an empty space inside.

For a given resonance frequency, an active current may be modeled to in only a portion of the first signal conducting portion 1011 instead of the entire first signal conducting portion 1011, may be modeled to flow in only a portion of the second signal conducting portion 1012 instead of the entire second signal conducting portion 1012, may be modeled to flow in only a portion of the ground conducting portion 1013 instead of the entire ground conducting portion 1013, and/or may be modeled to flow in only a portion of the conductors 1041 and 1042 instead of the entire conductors 1041 and 1042. When a depth of the first signal conducting portion 1011, the second signal conducting portion 1012, the ground conducting portion 1013, and the conductors 1041 and 1042 may be significantly deeper than a corresponding skin depth in the given resonance frequency, it may be ineffective. The significantly deeper depth, however, may increase the weight or manufacturing costs of the resonator 1000, in some instances.

Accordingly, for the given resonance frequency, the depth of each of the first signal conducting portion 1011, the second signal conducting portion 1012, the ground conducting portion 1013, and the conductors 1041 and 1042 may be appropriately determined based on the corresponding skin depth of each of the first signal conducting portion 1011, the second signal conducting portion 1012, the ground conducting portion 1013, and the conductors 1041 and 1042. When the first signal conducting portion 1011, the second signal conducting portion 1012, the ground conducting portion 1013, and the conductors 1041 and 1042 has an appropriate depth deeper than a corresponding skin depth, the resonator 1000 may be manufactured to be lighter in weight, and manufacturing costs of the resonator 1000 may also decrease.

For example, as illustrated in FIG. 10A, the depth of the second signal conducting portion 1012 (as further illustrated in the enlarged view region 1060 indicated by a circle) may be determined as "d" mm, and d may be determined according to $$d = \frac{1}{\sqrt{\pi f \mu \sigma}}.$$

Here, f denotes a frequency, μ denotes a magnetic permeability, and σ denotes a conductor constant. In one implementation, when the first signal conducting portion 1011, the second signal conducting portion 1012, the ground conducting portion 1013, and the conductors 1041 and 1042 are made of copper and they may have a conductivity of $5.8 \times 10^7$ siemens per meter (S·m$^{-1}$), the skin depth may be about 0.6 mm with respect to 10 kHz of the resonance frequency, and the skin depth may be about 0.006 mm with respect to 100 MHz of the resonance frequency.

The resonator 1000 may include a matcher 1030, as illustrated in FIG. 10A.

For example, the resonator 1000 may include a matcher 1050, as illustrated in FIG. 10B with conduction portions 1051 and 1052 of the matcher 1050 may be connected to the capacitor 1020.

Figure 11A:
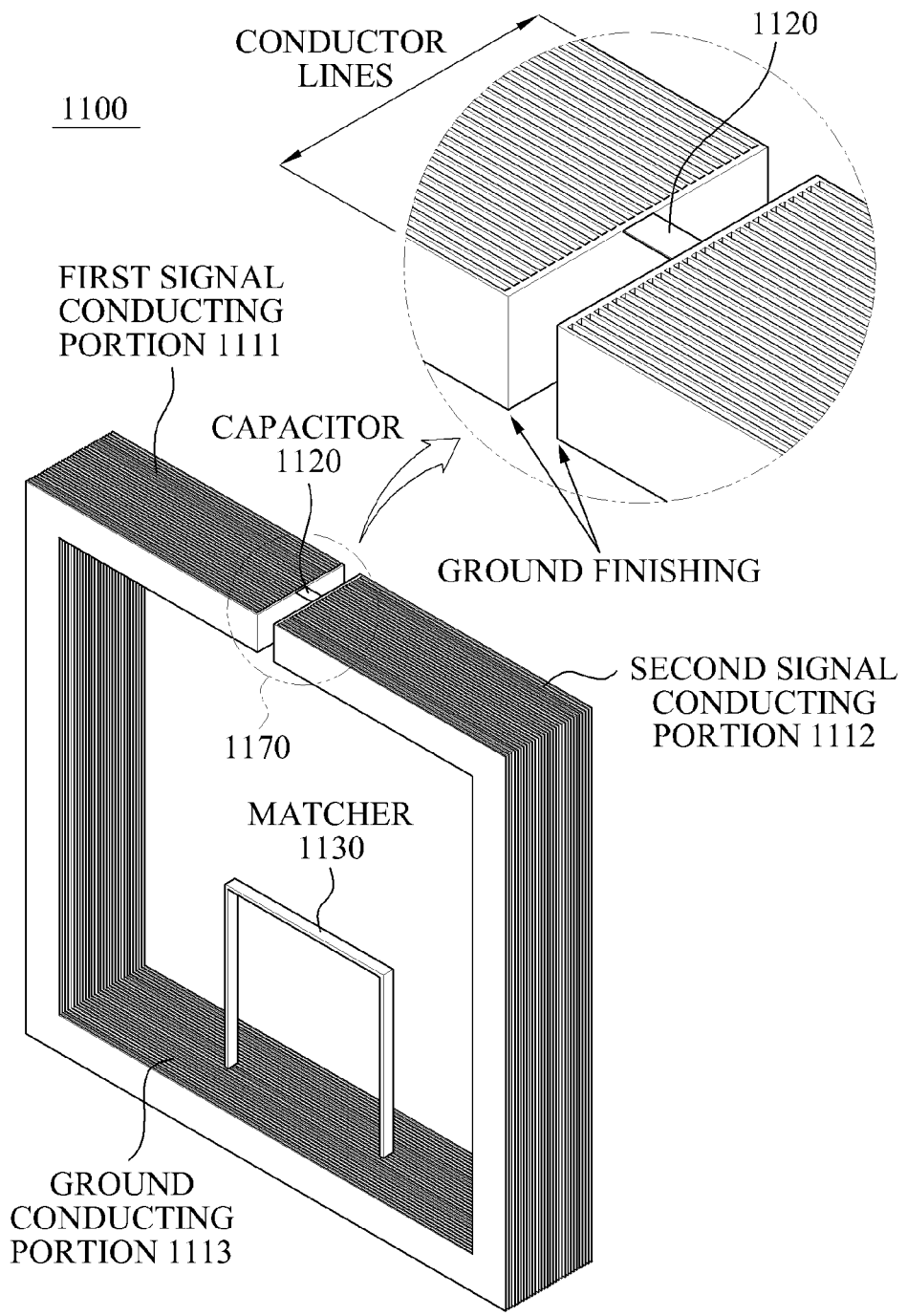
Figure 11B:
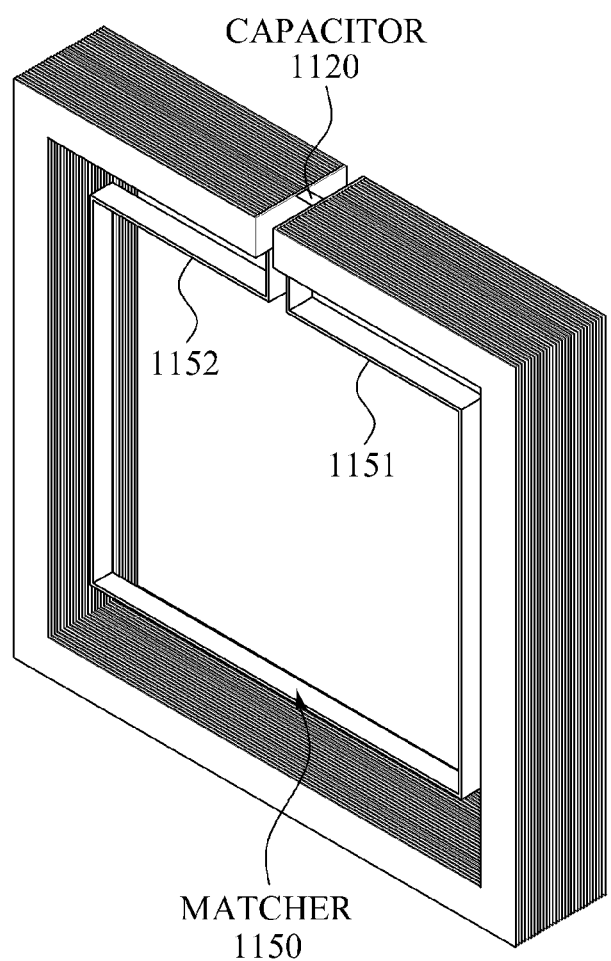

FIGS. 11A and 11B illustrate a resonator for wireless power transmission using a parallel-sheet configuration.

Referring to FIG. 11A, the parallel-sheet configuration may be applicable to a first signal conducting portion 1111 and a second signal conducting portion 1112 included in a resonator 1100.

Each of the first signal conducting portion 1111 and the second signal conducting portion 1112 may not be a perfect conductor, and thus may have an inherent resistance. Due to this resistance, an ohmic loss may occur. The ohmic loss may decrease a Q-factor and may also decrease a coupling effect.

By applying the parallel-sheet configuration to each of the first signal conducting portion 1111 and the second signal conducting portion 1112, it may be possible to decrease the ohmic loss, and to increase the Q-factor and the coupling effect. Referring to the enlarged view portion 1170 indicated by a circle in FIG. 11A, when the parallel-sheet configuration is applied, the first signal conducting portion 1111 and the second signal conducting portion 1112 may include a plurality of conductor lines. The plurality of conductor lines may be disposed in parallel, and may be electrically connected (i.e., shorted) at an end portion of each of the first signal conducting portion 1111 and the second signal conducting portion 1112.

When the parallel-sheet configuration is applied to each of the first signal conducting portion 1111 and the second signal conducting portion 1112, the plurality of conductor lines may be disposed in parallel. Accordingly, the sum of resistances of the conductor lines may decrease. Consequently, the resistance loss may decrease, and the Q-factor and the coupling effect may increase.

The resonator 1100 may include a matcher 1130, as illustrated in FIG. 11A.

For example, the resonator 1100 may include a matcher 1150, as illustrated in FIG. 11B, with conduction portions 1151 and 1152 of the matcher 1150 may be connected to the capacitor 1120.

Figure 12A:
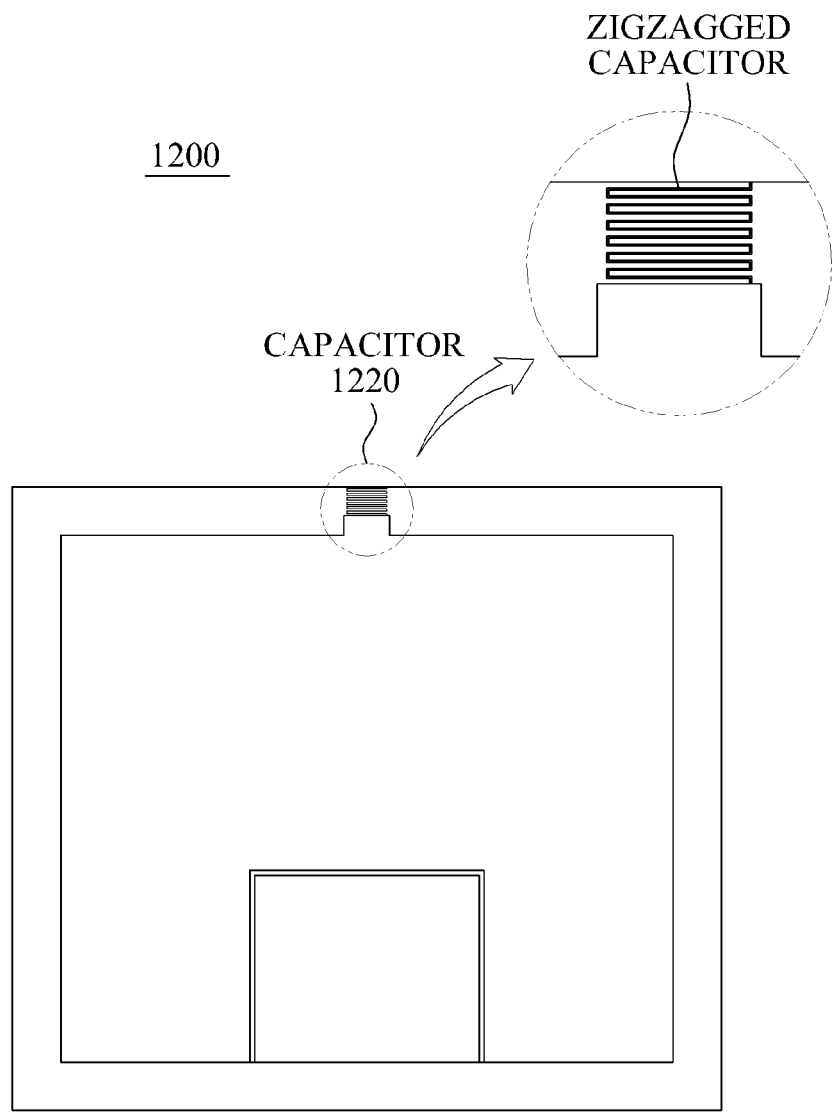

FIGS. 12A and 12B illustrate a resonator for wireless power transmission including a distributed capacitor.

Referring to FIG. 12A, a capacitor 1220 included in a resonator 1200 is configured for the wireless power transmission. A capacitor may be configured as a lumped element and may have a relatively high equivalent series resistance (ESR). A variety of schemes have been proposed to decrease the ESR contained in the capacitor of the lumped element. According to an example embodiment, by using the capacitor 1220 as a distributed element, it may be possible to decrease the ESR. As will be appreciated, a loss caused by the ESR may decrease a Q-factor and a coupling effect.

As illustrated in FIG. 12A, the capacitor 1220 may be configured with a zigzagged conductive line and a dielectric material.

By employing the capacitor 1220 as the distributed element, it may be possible to decrease the loss occurring due to the ESR in some instances. In addition, by disposing, in parallel, a plurality of capacitors as lumped elements, it may be possible to decrease the loss occurring due to the ESR. Since a resistance of each of the capacitors as the lumped elements decreases through a parallel connection, active resistances of parallel-connected capacitors as the lumped elements may also decrease, whereby the loss occurring due to the ESR may decrease. For example, by employing ten capacitors of 1 pF each instead of using a single capacitor of 10 pF, it may be possible to decrease the loss occurring due to the ESR in some instances.

As illustrated in FIG. 12B, the resonator 1200 may include a matcher 1230. Conduction portions 1231 and 1232 of the matcher 1230 may be connected to the capacitor 1220.

Figure 13A:
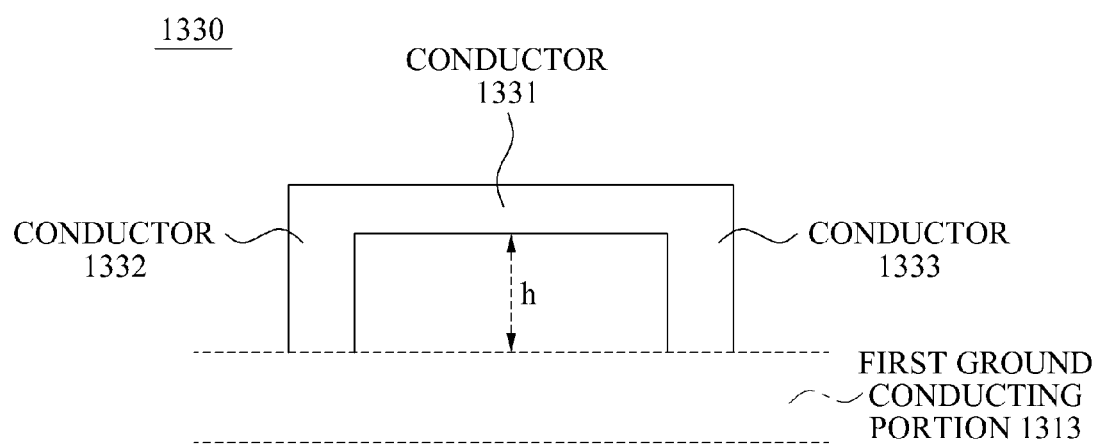
Figure 13B:
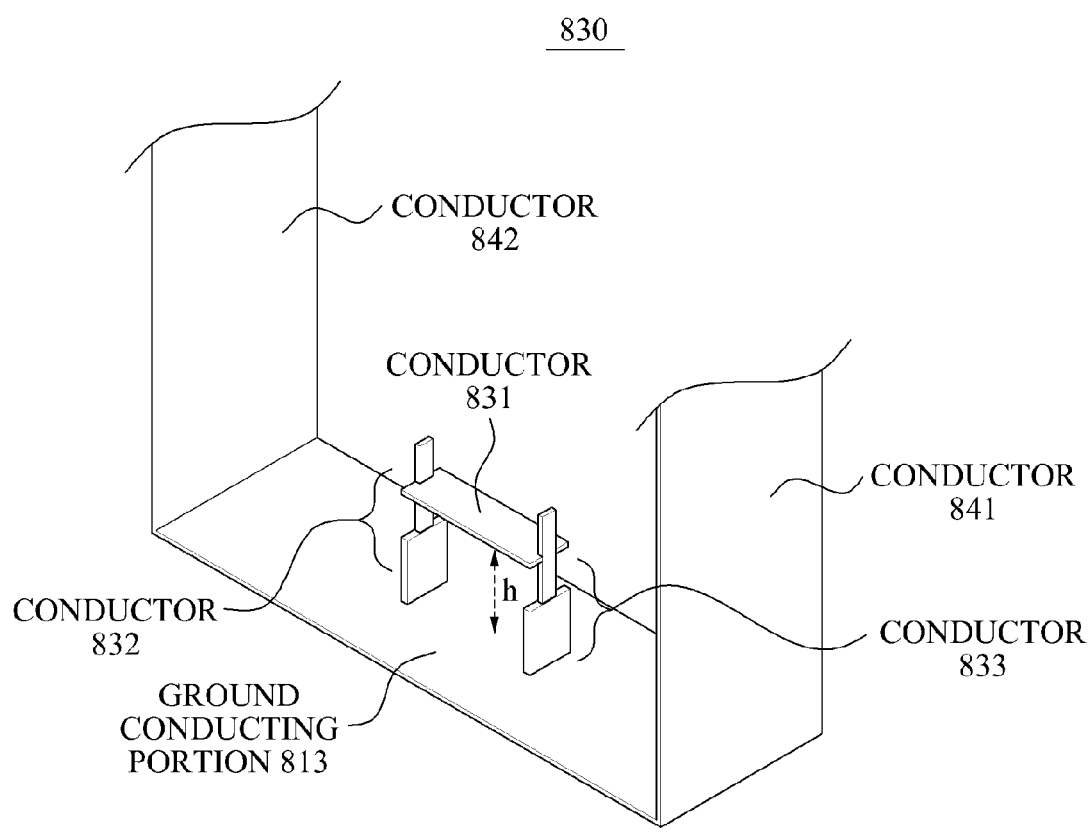

FIG. 13A illustrates a matcher used in a resonator having the 2D structure, and FIG. 13B illustrates an example of a matcher used in a resonator having the 3D structure.

FIG. 13A illustrates a portion of a resonator 1300 including a matcher 1330, and FIG. 13B illustrates a portion of the resonator 800 of FIG. 8A including the matcher 830.

Referring to FIG. 13A, the matcher 1330 includes a conductor 1331, a conductor 1332, and a conductor 1333. The conductors 1332 and 1333 may be connected to the conductor 1331, and to a first ground conducting portion 1313 of a transmission line. The matcher 1330 may correspond to the feeder 360 of FIG. 3B. The impedance of the 2D resonator may be determined based on a distance h between the conductor 1331 and the first ground conducting portion 1313. The distance h between the conductor 1331 and the first ground conducting portion 1313 may be controlled by a controller. The distance h between the conductor 1331 and the first ground conducting portion 1313 may be adjusted using a variety of schemes. For example, the variety of schemes may include one or more of the following: a scheme of adjusting the distance h by adaptively activating one of the conductors 1331, 1332, and 1333, a scheme of adjusting the physical location of the conductor 1331 up and down, or the like.

Referring to FIG. 13B, the matcher 830 includes the conductor 831, a conductor 832, a conductor 833 and conductors 841 and 842. The conductors 832 and 833 may be connected to the ground conducting portion 813 and the conductor 831. The impedance of the 3D resonator may be determined based on a distance h between the conductor 831 and the ground conducting portion 813. The distance h between the conductor 831 and the ground conducting portion 813 may be controlled by the controller, for example. Similar to the matcher 1330 of FIG. 13A, in the matcher 830, the distance h between the conductor 831 and the ground conducting portion 813 may be adjusted using a variety of schemes. For example, the variety of schemes may include one or more of the following: a scheme of adjusting the distance h by adaptively activating one of the conductors 831, 832, and 833, a scheme of adjusting the physical location of the conductor 831 up and down, or the like.

In some implementations, the matcher may include an active element. Thus, a scheme of adjusting an impedance of a resonator using the active element may be similar to the examples described above. For example, the impedance of the resonator may be adjusted by changing a path of a current flowing through the matcher using the active element.

Figure 14:
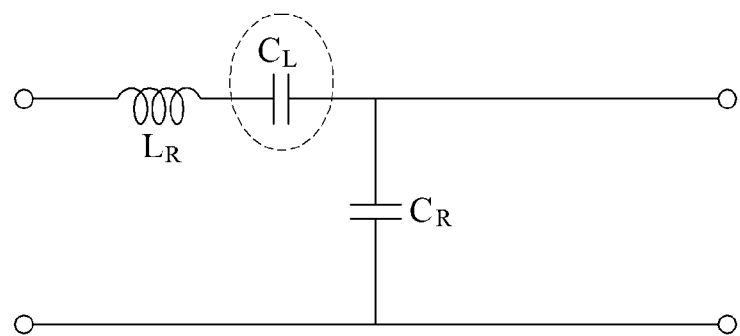
FIG. 14 is a diagram illustrating one equivalent circuit of a resonator of FIG. 8A.

FIG. 14 illustrates one equivalent circuit of the resonator 800 of FIG. 8A.

The resonator 800 of FIG. 9 for a wireless power transmission may be modeled to the equivalent circuit of FIG. 14. In the equivalent circuit depicted in FIG. 14, $L_R$ denotes an inductance of the power transmission line, $C_L$ denotes the capacitor 820 that is inserted in a form of a lumped element in the middle of the power transmission line, and $C_R$ denotes a capacitance between the power transmissions and/or ground of FIG. 8A.

In some instances, the resonator 800 may have a zeroth resonance characteristic. For example, when a propagation constant is "0", the resonator 800 may be assumed to have $\omega_{MZR}$ as a resonance frequency. The resonance frequency $\omega_{MZR}$ may be expressed by Equation 2 as follows:

$$\omega_{MZR} = \frac{1}{\sqrt{L_R C_L}} \quad \text{[Equation 2]}$$

In Equation 2, MZR denotes a Mu zero resonator.

Referring to Equation 2, the resonance frequency $\omega_{MZR}$ of the resonator 800 may be determined by $L_R/C_L$. A physical size of the resonator 800 and the resonance frequency $\omega_{MZR}$ may be independent with respect to each other. Since the physical sizes are independent with respect to each other, the physical size of the resonator 800 may be sufficiently reduced.

Figure 15:
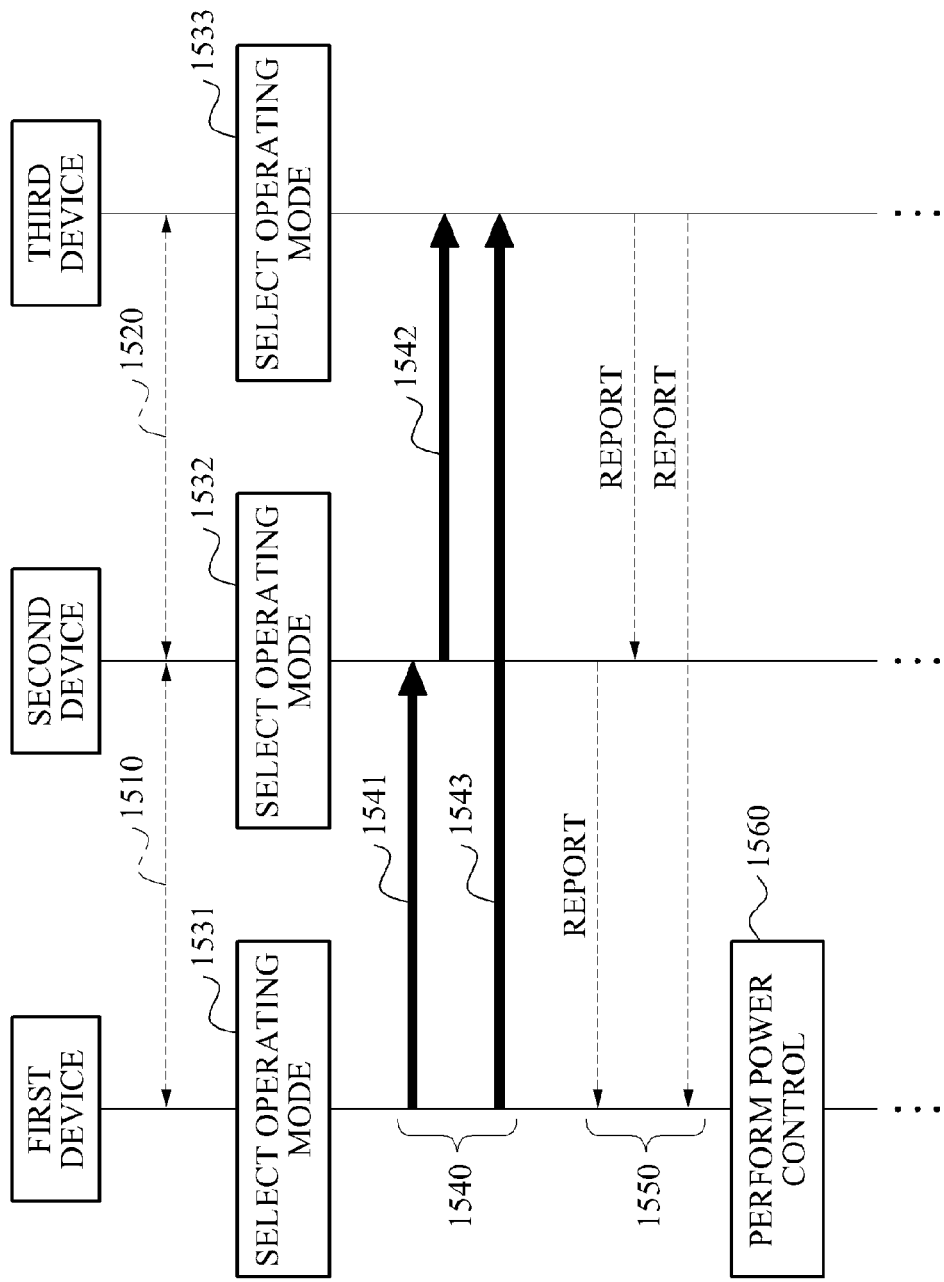
FIG. 15 is a diagram illustrating a method for transmitting and receiving wireless power.

FIG. 15 illustrates a method for transmitting and receiving a wireless power.

Referring to FIG. 15, a first device, a second device, and a third device may be implemented, for example, using the target device 120 of FIG. 1, or the electronic device 220 of FIG. 2. Additionally, the first device may be implemented, for example, by using the source device 110 of FIG. 1. When the second device transmits a power to the third device, the second device may be referred to as a wireless power transmitter, and the third device may be referred to as a wireless power receiver. When the second device and the third device receive a power simultaneously from the first device, the second device and the third device may be referred to as wireless power receivers.

In operations 1510 or 1520, the first device, the second device, and the third device perform communications with different electronic devices, and determine one of a plurality of operating modes by the communications including a power reception mode, a relay mode, and a power transmission mode, for instance.

For example, in 1510, the first device may perform a communication with the second device and the third device, to perform authentication of the second device and the third device, or to check an amount of a power required in each of the second device and the third device.

In operation 1531, the first device selects an operating mode of the first device. In operation 1532, the second device selects an operating mode of the second device. In operation 1533, the third device selects an operating mode of the third device. For example, the first device may select the power transmission mode as the operating mode. The second device may select one of the relay mode, the power reception mode, or the power transmission mode, as the operating mode. The third device may select a power reception mode as the operating mode.

In operation 1540, power transmission, power relay, and power reception may be performed. Specifically, in operation 1541, the first device transmits a power to the second device. In operation 1542, the second device relays the power received from the first device to the third device. Additionally, in operation 1542, the second device transmits the power to the third device using a stored power. In some implementations, a plurality of electronic devices may be further located between the second device and the third device. A resonator of the third device may receive a power from the first device, namely a wireless power transmitter, by passing through the plurality of electronic devices. Additionally, a resonator of the second device may transmit a power to the third device, namely a wireless power receiver, by passing through the plurality of electronic devices. In operations 1541 and 1543, a resonator of the first device may simultaneously transmit a power to the second device and the third device. Thus, the resonator of the first device may simultaneously transmit a power to the plurality of electronic devices.

In operation 1550, the second device and the third device transmit, to the first device, reports for the received powers. For example, the reports may include information on an amount of a power received to a resonator.

In operation 1560, the first device may perform power control. The power control may be performed to adjust a resonance frequency, and to adjust an impedance.

Figure 16:
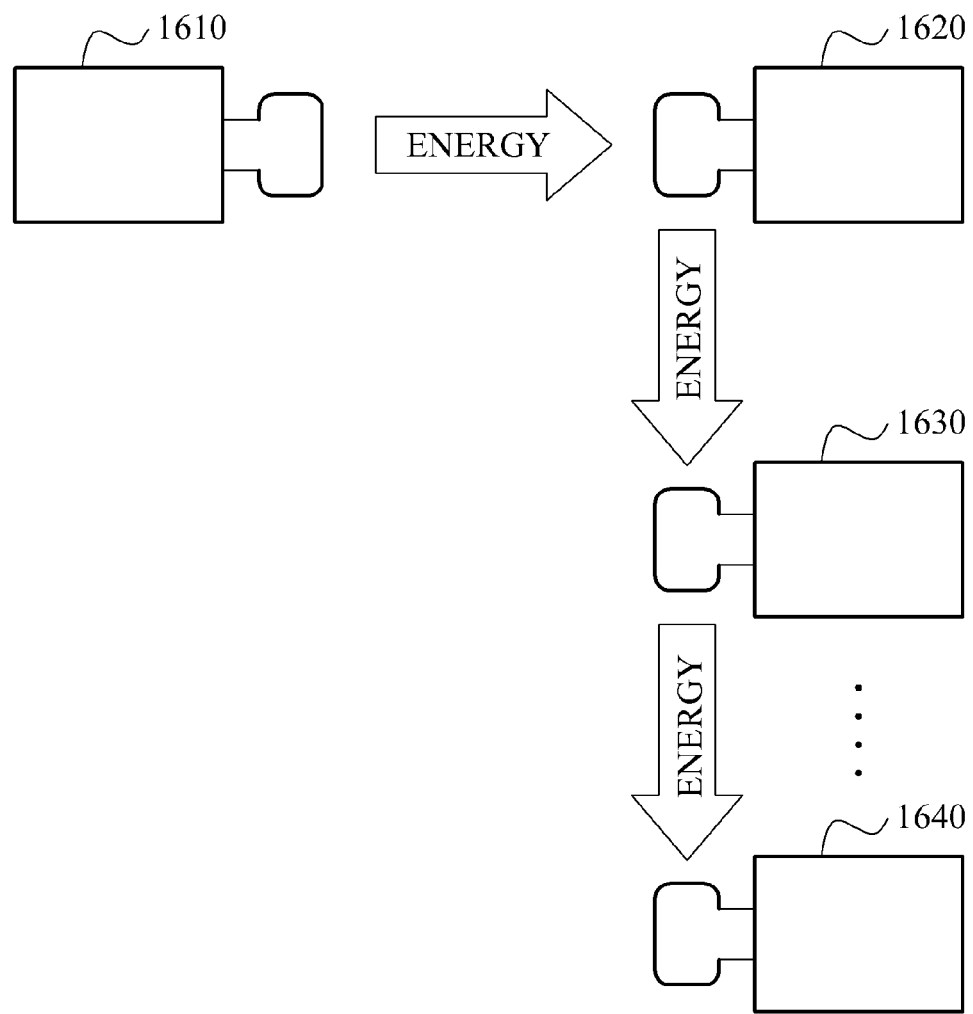
FIGS. 16 and 17 are diagrams illustrating a method for transmitting and receiving wireless power between electronic devices.
Figure 17:
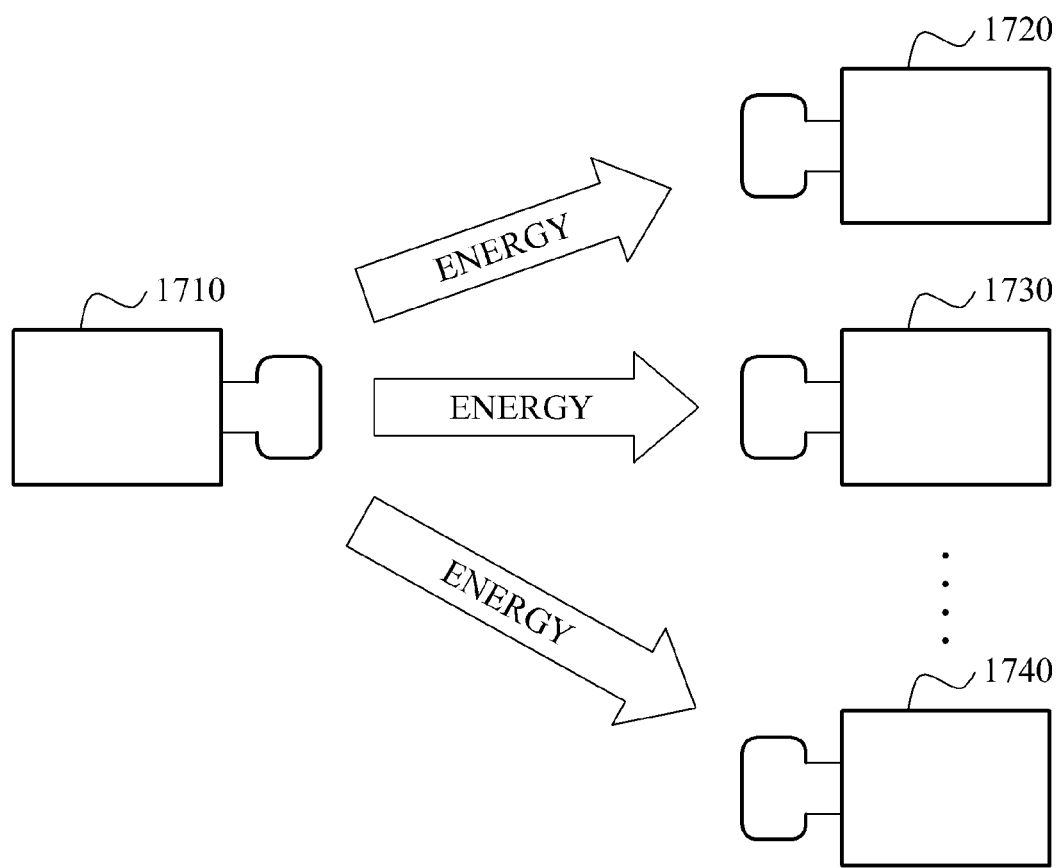

FIGS. 16 and 17 illustrate examples of a method for transmitting and receiving wireless power between electronic devices.

Referring to FIG. 16, an electronic device 1610 may be implemented, for example, using the source device 110 of FIG. 1, or the electronic device 220 of FIG. 2. An electronic device 1640 may be implemented, for example, using the target device 120 of FIG. 1, or the electronic device 220 of FIG. 2. For example, the electronic device 1640 may receive a power from the electronic device 1610, via a plurality of electronic devices, for example electronic devices 1620 and 1630. Thus, the electronic devices 1620 and 1630 may be operated in the relay mode. A power transfer path from the electronic device 1610 to the electronic device 1640 may be determined by communication, or may be set in advance.

Referring to FIG. 17, an electronic device 1710 may be implemented, for example, using the source device 110 of FIG. 1, or the electronic device 220 of FIG. 2. Additionally, each of a plurality of electronic devices, for example electronic devices 1720, 1730, and 1740, may be implemented, for example, using the target device 120 of FIG. 1, or the electronic device 220 of FIG. 2. As illustrated in FIG. 17, power may be simultaneously transmitted from the electronic device 1710 to the electronic devices 1720, 1730, and 1740.

Figure 18:
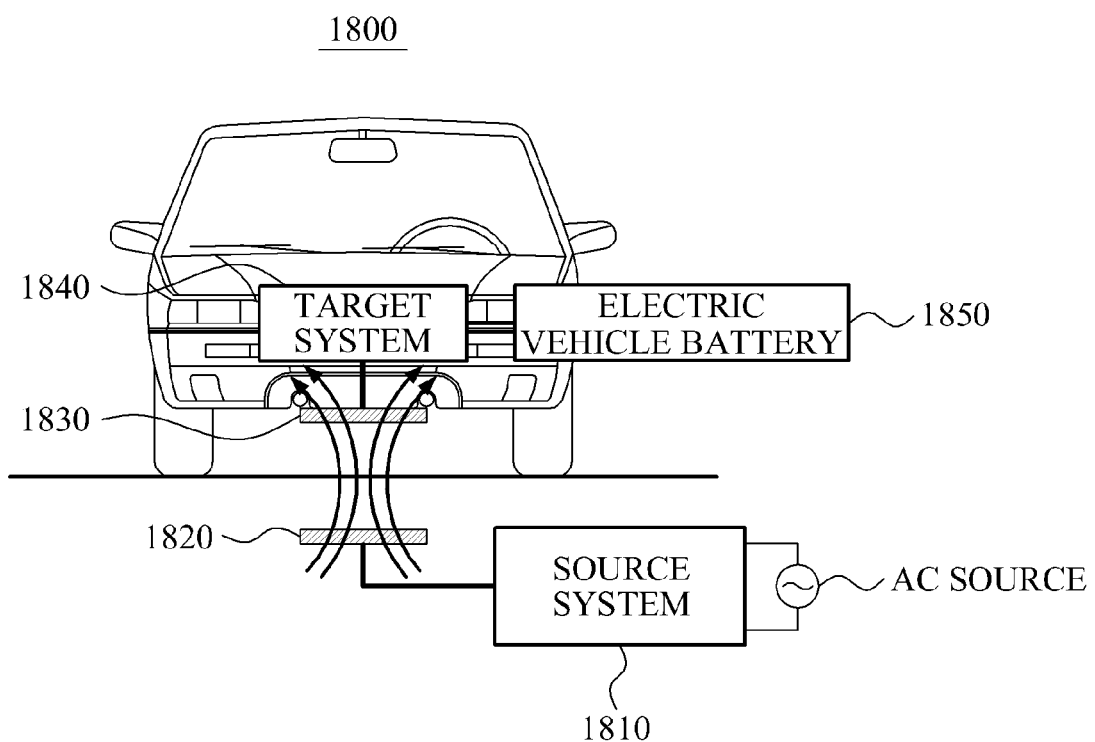
FIG. 18 is a diagram illustrating an electric vehicle charging system.

FIG. 18 illustrates an electric vehicle charging system.

Referring to FIG. 18, an electric vehicle charging system 1800 includes a source system 1810, a source resonator 1820, a target resonator 1830, a target system 1840, and an electric vehicle battery 1850.

The electric vehicle charging system 1800 may have a similar structure to the wireless power transmission system of FIG. 1. The source system 1810 and the source resonator 1820 in the electric vehicle charging system 1800 may function as a source. Additionally, the target resonator 1830 and the target system 1840 in the electric vehicle charging system 1800 may function as a target.

The source system 1810 may include an alternating current-to-direct current (AC/DC) converter, a power detector, a power converter, a control/communication unit, similarly to the source 110 of FIG. 1. The target system 1840 may include a rectification unit, a DC-to-DC (DC/DC) converter, a switch unit, a charging unit, and a control/communication unit, similarly to the target 120 of FIG. 1.

The electric vehicle battery 1850 may be charged by the target system 1840.

The electric vehicle charging system 1800 may use a resonant frequency in a band of a few kilohertz (KHz) to tens of MHz.

The source system 1810 may generate power, based on a type of charging vehicle, a capacity of a battery, and a charging state of a battery, and may supply the generated power to the target system 1840.

The source system 1810 may control the source resonator 1820 and the target resonator 1830 to be aligned. For example, when the source resonator 1820 and the target resonator 1830 are not aligned, the controller of the source system 1810 may transmit a message to the target system 1840, and may control alignment between the source resonator 1820 and the target resonator 1830.

For example, when the target resonator 1830 is not located in a position enabling maximum magnetic resonance, the source resonator 1820 and the target resonator 1830 may not be aligned. When a vehicle does not stop accurately, the source system 1810 may induce a position of the vehicle to be adjusted, and may control the source resonator 1820 and the target resonator 1830 to be aligned.

The source system 1810 and the target system 1840 may transmit or receive an ID of a vehicle, or may exchange various messages, through communication.

The descriptions of FIGS. 2 through 15 may be applied to the electric vehicle charging system 1800. However, the electric vehicle charging system 1800 may use a resonant frequency in a band of a few KHz to tens of MHz, and may transmit power that is equal to or higher than tens of watts to charge the electric vehicle battery 1850.

Figure 19:
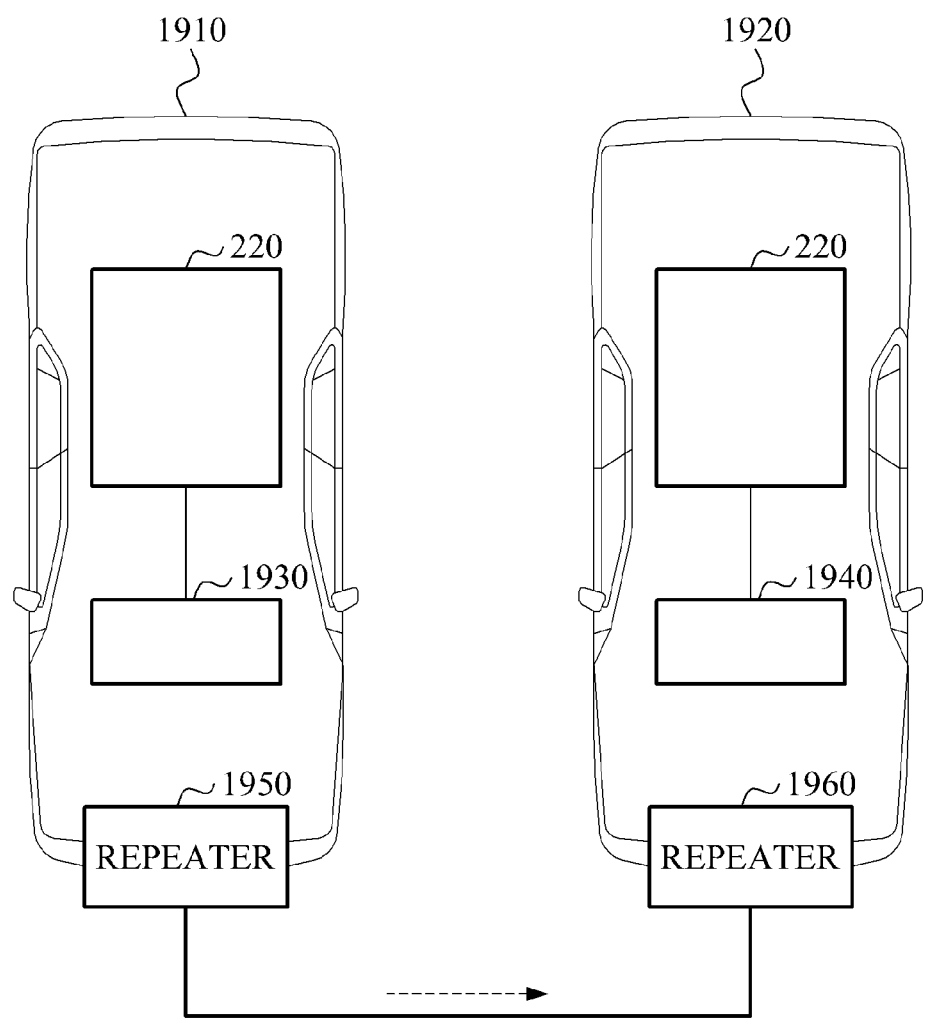
FIG. 19 is a diagram illustrating a wireless power transmission method of an electric vehicle.

FIG. 19 illustrates an example of a wireless power transmission method of an electric vehicle.

In FIG. 19, wireless power transmission may be performed between electric vehicles.

A first electric vehicle 1910 may be operated in a power transmission mode, and a second electric vehicle 1920 may be operated in a power reception mode.

The first electric vehicle 1910 may have the same configuration as the electronic device 220 of FIG. 2. Additionally, the second electric vehicle 1920 may have the same configuration as the electronic device 220 of FIG. 2. However, for convenience of description, the electronic device 220 is assumed to include the power converter 228, the rectification unit 222, the DC/DC converter 223, the switch unit 224, the charging unit 225, the control/communication unit 226, and the path controller 227, excluding the resonator 221.

The first electric vehicle 1910 may further include a source resonator 1930 operated in the power transmission mode, and the second electric vehicle 1920 may further include a target resonator 1940 operated in the power reception mode.

The charging unit 225 may be, for example, a battery mounted in an electric vehicle. For example, the charging unit 225 may charge the electric vehicle with power of at least tens of watts.

Additionally, the wireless power transmission between the first electric vehicle 1910 and the second electric vehicle 1920 may be performed via repeaters 1950 and 1960.

The first electric vehicle 1910 may perform the wireless power transmission using an external power source, or using power used to charge a battery.

According to various embodiments, an electronic device may wirelessly receive a power, while wirelessly transmitting a power.

Additionally, an electronic device may wirelessly receive power supply when a power is required, regardless of a location.

The units described herein may be implemented using hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processor.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. An electronic device for transmitting and receiving wireless power, the electronic device comprising:
   a resonator configured to operate, based on a plurality of operating modes of the electronic device including a power reception mode, a relay mode, and a power transmission mode, wherein:

(i) in the power reception mode, the resonator is configured to receive power from a wireless power transmitter, (ii) in the relay mode, the resonator is configured to relay power received from the wireless power transmitter to a wireless power receiver, and (iii) in the power transmission mode, the resonator is configured to transmit power to the wireless power receiver; and a path controller configured to control at least one electrical pathway of electronic device based on the operating mode.

2. The electronic device of claim 1, further comprising:
a power converter configured to convert direct current (DC) voltage to alternating current (AC) voltage using a resonance frequency, and to transfer the AC current to the resonator, when the electronic device is operated in the power transmission mode.

3. The electronic device of claim 2, further comprising a power amplifier configured to amplify the DC voltage.

4. The electronic device of claim 1, further comprising:
a rectification unit configured to generate a DC signal by rectifying an AC signal of a power received via the resonator, when the electronic device is operated in the power reception mode.

5. The electronic device of claim 1, further comprising:
a DC-to-DC (DC/DC) converter configured to supply voltage of a predetermined level to a load by adjusting a level of the DC signal.

6. The electronic device of claim 1, further comprising:
a control/communication unit configured to perform a communication with the wireless power transmitter or the wireless power receiver, to determine the operating mode by the communication, to control the path controller based on the determined operating mode, or any combination thereof.

7. The electronic device of claim 1, wherein the resonator is configured to receive the power from the wireless power transmitter by passing through one or more electronic devices.

8. The electronic device of claim 1, wherein the resonator is configured to transmit the power to the wireless power receiver by passing through one or more electronic devices.

9. The electronic device of claim 1, wherein the resonator is configured to simultaneously transmit the power to a plurality of electronic devices.

10. The electronic device of claim 1 further comprising:
a control/communication unit configured to control a magnetic field to be uniformly distributed, based on a direction of an induced current flowing in the resonator, and on a direction of an input current flowing in a feeding unit,
wherein the magnetic field is formed in the resonator.

11. A method for transmitting and receiving wireless power in an electronic device, the method comprising:
determining one of a plurality of operating modes of the electronic device, the plurality of operating modes of the electronic device including a power reception mode, a relay mode, and a power transmission mode; and (i) in the power reception mode, receiving power from a wireless power transmitter, (ii) in the relay mode, relaying power received from the wireless power transmitter to a wireless power receiver, and (iii) in the power transmission mode, transmitting power to the wireless power receiver.

12. The method of claim 11, further comprising:
performing a communication with another electronic device to determine the operating mode of the electronic device.

13. The method of claim 11, further comprising:
supplying voltage of a predetermined level to a load by adjusting a level of a DC signal.

14. The method of claim 11, further comprising:
generating power using a resonance frequency; and
transferring the generated power to a resonator.

15. The method of claim 11, further comprising generating a DC signal by rectifying an AC signal of power received via a resonator.

16. The method of claim 11, further comprising:
receiving the power from the wireless power transmitter by passing through one or more electronic devices.

17. The method of claim 11, further comprising:
transmitting the power to the wireless power receiver by passing through one or more electronic devices.

18. The method of claim 11, further comprising:
simultaneously transmitting the power to a plurality of electronic devices.

19. A resonator device comprising:
a feeder configured to receive an input current and to form a magnetic field; and
a resonator configured to form another magnetic field based on an induced current generated by the magnetic field of the feeder,
wherein, when the magnetic field formed by the feeder and the another magnetic field formed by the source resonator are combined, the strength of the combined magnetic field changes within the feeder and outside the feeder.

20. The resonator device of claim 19, wherein:
(i) the strength of the combined magnetic field decreases within the feeder and increases outside the feeder; or
(ii) the strength of the combined magnetic field increases within the feeder and deceases outside the feeder.

21. The resonator device of claim 19, wherein the resonator and the feeder have a common ground.

22. The resonator device of claim 19, wherein the resonator comprises a capacitor.

23. The resonator of claim 22, wherein the feeder is electrically connected to the capacitor.

24. The resonator of claim 19, wherein the feeder is positioned at least partially within the resonator.

25. The resonator of claim 19, wherein the resonator has a closed loop structure.

26. The resonator of claim 19, wherein the resonator comprises:
a first transmission line comprising a first signal conducting portion, a second signal conducting portion, and a first ground conducting portion, the first ground conducting portion corresponding to the first signal conducting portion and the second signal conducting portion;
a first conductor electrically connecting the first signal conducting portion to the first ground conducting portion;
a second conductor electrically connecting the second signal conducting portion to the first ground conducting portion; and
at least one first capacitor inserted between the first signal conducting portion and the second signal conducting portion, in series with respect to a current flowing through the first signal conducting portion and the second signal conducting portion.

27. The resonator of claim 19, wherein the feeder comprises:
- a second transmission line comprising a third signal conducting portion, a fourth signal conducting portion, and a second ground conducting portion, the second ground conducting portion corresponding to the third signal conducting portion and the fourth signal conducting portion;
- a third conductor electrically connecting the third signal conducting portion to the second ground conducting portion;
- a fourth conductor electrically connecting the fourth signal conducting portion to the second ground conducting portion;
- a fifth conductor electrically connecting the first signal conducting portion to the third signal conducting portion; and
- a sixth conductor electrically connecting the second signal conducting portion to the fourth signal conducting portion.

28. The resonator of claim 19, further comprising:
- a control/communication unit configured to control the magnetic field to be uniformly distributed, based on a direction of an induced current flowing in the resonator, and on a direction of an input current flowing in the feeder.

29. The resonator of claim 28, wherein the controller is configured to adjust the size of the feeder.

30. The resonator of claim 19, further comprising:
- a matching device configured to match the input impedance to an output impedance.

\* \* \* \* \*